(12) United States Patent
Matsunaga

(10) Patent No.: US 11,867,098 B2
(45) Date of Patent: Jan. 9, 2024

(54) VALVE TIMING ADJUSTING DEVICE

(71) Applicant: DENSO CORPORATION, Kariya (JP)

(72) Inventor: Yuuki Matsunaga, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/824,457

(22) Filed: May 25, 2022

(65) Prior Publication Data

US 2022/0282644 A1    Sep. 8, 2022

Related U.S. Application Data

(63) Continuation of application No. PCT/JP2020/043721, filed on Nov. 25, 2020.

(30) Foreign Application Priority Data

Nov. 29, 2019   (JP) .................. 2019-217204

(51) Int. Cl.
*F01L 1/344* (2006.01)
*B01D 35/02* (2006.01)

(52) U.S. Cl.
CPC .......... *F01L 1/3442* (2013.01); *B01D 35/02* (2013.01); *F01L 2001/3443* (2013.01); *F01L 2001/3444* (2013.01)

(58) Field of Classification Search
CPC .......... F01L 1/3442; F01L 2001/34426; F01L 2001/3443; F01L 2001/3444; B01D 35/02
See application file for complete search history.

(56) References Cited

U.S. PATENT DOCUMENTS

| 8,726,866 | B1 | 5/2014 | Lichti |
| 2008/0173267 | A1 | 7/2008 | Takahashi et al. |
| 2013/0092113 | A1* | 4/2013 | Bohner ................. F15B 21/041 |
| | | | 251/324 |
| 2017/0130620 | A1* | 5/2017 | Hamasaki ............. F01L 1/3442 |

FOREIGN PATENT DOCUMENTS

| WO | 2021/106890 | 6/2021 |
| WO | 2021/106892 | 6/2021 |

OTHER PUBLICATIONS

U.S. Appl. No. 17/824,341, filed May 25, 2022 to Yuuki Matsunaga (37 pages).
U.S. Appl. No. 17/824,390, filed May 25, 2022 to Yuuki Matsunaga (33 pages).

* cited by examiner

*Primary Examiner* — Loren C Edwards
(74) *Attorney, Agent, or Firm* — Nixon & Vanderhye P.C.

(57) ABSTRACT

An oil passage portion forms a part of an oil supply passage inside. A check valve part includes a valve seat portion press-fitted into the oil passage portion. The check valve part allows flow of hydraulic oil from a hydraulic oil supply source to a hydraulic chamber, and restricts flow of the hydraulic oil from the hydraulic chamber to the hydraulic oil supply source. A filter is provided downstream of the valve seat portion in the oil supply passage so as to collect a foreign matter in the oil supply passage.

8 Claims, 15 Drawing Sheets

VALVE OPENING DIRECTION ←———→ VALVE CLOSING DIRECTION

US 11,867,098 B2

VALVE TIMING ADJUSTING DEVICE

CROSS REFERENCE TO RELATED APPLICATION

The present application is a continuation application of International Patent Application No. PCT/JP2020/043721 filed on Nov. 25, 2020, which designated the U.S. and claims the benefit of priority from Japanese Patent Application No. 2019-217204 filed on Nov. 29, 2019. The entire disclosures of all of the above applications are incorporated herein by reference.

TECHNICAL FIELD

The present disclosure relates to a valve timing adjusting device.

BACKGROUND ART

A valve timing adjusting device includes a check valve part that allows flow of hydraulic oil from a hydraulic oil supply source to a hydraulic chamber, and restricts a flow of the hydraulic oil from the hydraulic chamber to the hydraulic oil supply source.

SUMMARY

According to an aspect of the present disclosure, a valve timing adjusting device that adjusts a valve timing of a valve of an internal combustion engine includes:
- a phase conversion unit that includes a hydraulic chamber and is capable of converting a rotational phase between a drive shaft and a driven shaft of the internal combustion engine by hydraulic oil supplied from a hydraulic oil supply source to the hydraulic chamber, and adjusting a valve timing of the valve;
- a hydraulic oil control unit capable of controlling flow of the hydraulic oil supplied to the hydraulic chamber by controlling the hydraulic oil flowing through an oil supply passage connecting the hydraulic oil supply source and the hydraulic chamber;
- an oil passage portion that forms a part of the oil supply passage inside;
- a check valve part configured to allow the hydraulic oil to flow from the hydraulic oil supply source to the hydraulic chamber, and restrict the hydraulic oil from flowing from the hydraulic chamber to the hydraulic oil supply source, wherein the check valve part includes a press-fit member press-fitted into the oil passage portion or a communication hole communicating with the oil passage portion; and
- a filter provided downstream of the press-fit member in the oil supply passage so as to collect a foreign matter in the oil supply passage.

BRIEF DESCRIPTION OF DRAWINGS

The present disclosure will become more apparent from the following detailed description with reference to the accompanying drawings. The drawings include.

DESCRIPTION OF EMBODIMENTS

Figure 1:
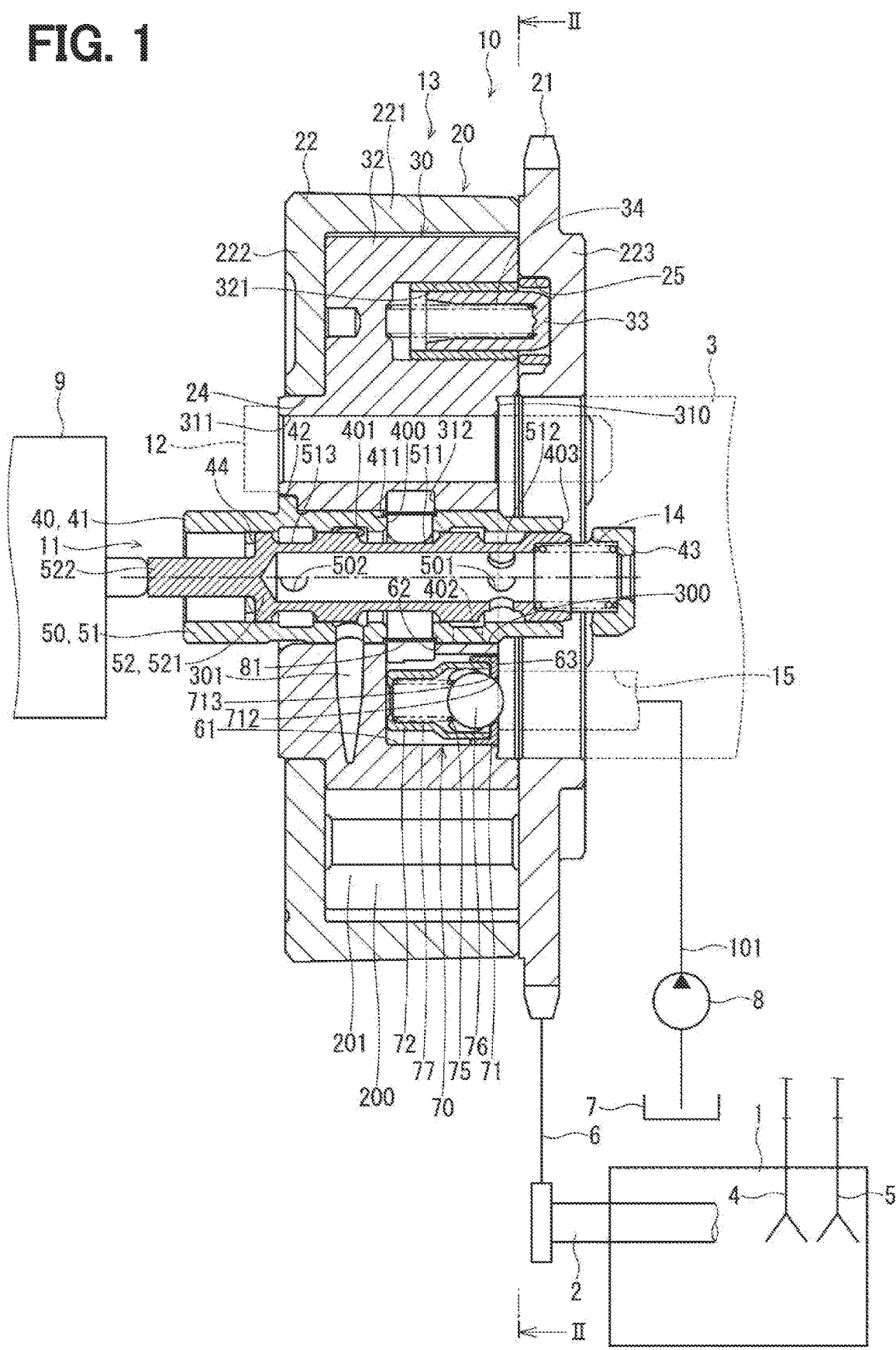
FIG. 1 is a cross-sectional view illustrating a valve timing adjusting device according to a first embodiment.

To begin with, examples of relevant techniques will be described.

Conventionally, there has been known a valve timing adjusting device including a check valve part that allows flow of hydraulic oil from a hydraulic oil supply source to a hydraulic chamber, and restricts a flow of the hydraulic oil from the hydraulic chamber to the hydraulic oil supply source. For example, in a valve timing adjusting device, a filter is provided on the upstream side of the check valve part.

In the valve timing adjusting device, a spring seat of a biasing member that biases a valve body of the check valve part is press-fitted into an inner peripheral wall of a hole. While assembling the check valve part, when the spring seat is press-fitted into the hole, a press-fit burr or a press-fit residue may be generated. Since the filter is provided on the upstream side of the check valve part, if the press-fit burr or the press-fit residue is generated when the spring seat is press-fitted into the hole, the press-fit burr or the press-fit residue may enter a sliding gap of precision sliding components and the like provided downstream of the spring seat, leading to abnormal wear of components or engagement of the press-fit burr or the press-fit residue into the components.

The present disclosure provides a valve timing adjusting device capable of suppressing abnormal wear of components due to a press-fit burr or a press-fit residue, and engagement of the press-fit burr or the press-fit residue into the components.

The present disclosure provides a valve timing adjusting device that adjusts a valve timing of a valve of an internal combustion engine, and the valve timing adjusting device includes a phase conversion unit, a hydraulic oil control unit, an oil passage portion, a check valve part, and a filter.

The phase conversion unit includes a hydraulic chamber and is capable of converting a rotational phase between a drive shaft and a driven shaft of the internal combustion engine by hydraulic oil supplied from a hydraulic oil supply source to the hydraulic chamber so as to adjust a valve timing of the valve. The hydraulic oil control unit is capable of controlling flow of the hydraulic oil supplied to the hydraulic chamber by controlling the hydraulic oil flowing through an oil supply passage connecting the hydraulic oil supply source and the hydraulic chamber.

The oil passage portion forms a part of the oil supply passage inside. The check valve part includes a press-fit member press-fitted into the oil passage portion or a communication hole communicating with the oil passage portion. The check valve part allows flow of the hydraulic oil from a side of the hydraulic oil supply source to a side of the hydraulic chamber, and restricts flow of the hydraulic oil from the side of the hydraulic chamber to the side of the hydraulic oil supply source.

The filter is provided on the downstream side with respect to the press-fit member in the oil supply passage, and can collect foreign matter in the oil supply passage. Acordingly, even if the press-fit burr or the press-fit residue is generated when the press-fit member is press-fitted into the oil passage portion or the communication hole, the press-fit burr or the press-fit residue can be collected by the filter on the downstream side with respect to the press-fit member. Thus, it is possible to suppress the press-fit burr or the press-fit residue from entering a sliding gap of the precision sliding components and the like provided downstream of the press-fit member. Therefore, it is possible to suppress abnormal wear of components due to the press-fit burr or the press-fit residue, and engagement of the press-fit burr or the press-fit residue with the components.

Hereinafter, a valve timing adjusting device according to embodiments will be described with reference to the drawings. In the embodiments, substantially the same components are denoted by the same reference numerals, and the description thereof will be omitted.

First Embodiment

FIGS. 1 to 6 illustrate a valve timing adjusting device of the first embodiment. A valve timing adjusting device 10 is mounted, for example, on a vehicle and changes a rotational phase of a camshaft 3 with respect to a crankshaft 2 of an engine 1 as an internal combustion engine to adjust the valve timing of an intake valve 4, while the camshaft 3 drives to open or close the intake valve 4 or an exhaust valve 5. The valve timing adjusting device 10 is provided in a power transmission path from the crankshaft 2 to the camshaft 3. The crankshaft 2 corresponds to a "drive shaft". The camshaft 3 corresponds to a "driven shaft". The intake valve 4 and the exhaust valve 5 correspond to a "valve".

A configuration of the valve timing adjusting device 10 will be described with reference to FIGS. 1 and 2. The valve timing adjusting device 10 includes a phase conversion unit 13, a hydraulic oil control unit 11, a check valve part 70, an oil passage portion 61, a recess hole 62, and a filter 81.

The phase conversion unit 13 includes a housing 20 and a vane rotor 30. The housing 20 includes a gear part 21 and a case 22. The case 22 includes a cylindrical portion 221, a plate portion 222, and a plate portion 223. The cylindrical portion 221 is formed in a cylindrical shape. The plate portion 222 is formed integrally with the cylindrical portion 221 so as to close one end of the cylindrical portion 221. The plate portion 223 is provided so as to close the other end of the cylindrical portion 221. Thus, an internal housing space 200 is formed inside the housing 20. The cylindrical portion 221 and the plate portion 222 are fixed so as to be relatively non-rotatable with respect to the plate portion 223. The gear part 21 is formed on an outer edge of the plate portion 223.

The plate portion 223 is fitted to an end of the camshaft 3. The camshaft 3 rotatably supports the housing 20. A chain 6 is wound around the gear part 21 and the crankshaft 2. The gear part 21 rotates in conjunction with the crankshaft 2. The case 22 has partition walls 23 protruding radially inward from the cylindrical portion 221 (see FIG. 2). A housing opening 24 opened to a space outside the case 22 is formed at the center of the plate portion 222 of the case 22.

The vane rotor 30 includes a boss 31 and four vanes 32. The boss 31 is formed in a substantially columnar shape and is fixed to the end of the camshaft 3. The vanes 32 protrude radially outward from the boss 31 between the respective partition walls 23. The internal housing space 200 inside the housing 20 is partitioned into a retard chamber 201 and an advance chamber 202 by the vane 32. That is, the housing 20 forms the retard chamber 201 and the advance chamber 202 with the vane rotor 30. The retard chamber 201 is located on one side in a circumferential direction with respect to the vane 32. The advance chamber 202 is located on the other side in the circumferential direction with respect to the vane 32. The vane rotor 30 rotates relative to the housing 20 in a retard direction or an advance direction according to the hydraulic pressure of the hydraulic oil supplied to the retard chamber 201 and the advance chamber 202. Here, the retard chamber 201 and the advance chamber 202 correspond to a "hydraulic chamber". When the vane rotor 30 rotates relative to the housing 20, one end surface slides on the plate portion 222, and the other end surface slides on the plate portion 223. That is, the vane rotor 30 and the housing 20 correspond to a "precision sliding component".

As described above, the phase conversion unit 13 includes the retard chamber 201 and the advance chamber 202, and is capable of converting the rotational phase between the crankshaft 2 and the camshaft 3 by the hydraulic oil supplied from an oil pump 8 as a "hydraulic oil supply source" to the retard chamber 201 and the advance chamber 202, and adjusting the valve timing of the intake valve 4.

The phase conversion unit 13 includes the housing 20, the vane rotor 30 and a rotor hole 300. The housing 20 rotates in conjunction with the crankshaft 2. The vane rotor 30 forms the retard chamber 201 and the advance chamber 202 with the housing 20, and is fixed to the camshaft 3 to integrally rotate with the camshaft 3. The rotor hole 300 is formed at the center of the vane rotor 30. The rotor hole 300 is formed to penetrate the boss 31 in an axial direction.

The vane rotor 30 includes a rotor recess 310. The rotor recess 310 is formed to be recessed in a circular shape from an end surface of the boss 31 adjacent to the camshaft 3. An inner diameter of the rotor recess 310 is set to be substantially the same as the outer diameter of the end of the camshaft 3. The valve timing adjusting device 10 is attached to the camshaft 3 such that the end of the camshaft 3 is fitted into the rotor recess 310. Thus, the position of the vane rotor 30 is stabilized in the radial direction with respect to the camshaft 3.

The vane rotor 30 includes bolt holes 311. The bolt holes 311 are formed on a radially outer side of the rotor hole 300 so as to penetrate the boss 31 in the axial direction. Three bolt holes 311 are formed at equal intervals in the circumferential direction of the boss 31 (see FIG. 2). The vane rotor 30 is fixed to the camshaft 3 by screwing bolts 12 inserted through the bolt holes 311 into the end of the camshaft 3.

The hydraulic oil control unit 11 is capable of controlling the flow of the hydraulic oil supplied to the retard chamber 201 and the advance chamber 202 by controlling the hydraulic oil flowing through an oil supply passage 101 connecting the oil pump 8 to the retard chamber 201 and the advance chamber 202.

The hydraulic oil control unit 11 includes a control sleeve 40, a control spool 50, and a control spring 14. The control sleeve 40 includes a control sleeve body 41, a sleeve locking portion 42, a spring seat 43, and a locking portion 44. The control sleeve body 41 is formed in a substantially cylindrical shape. The sleeve locking portion 42 is formed so as to protrude radially outward from an outer peripheral wall of the control sleeve body 41. The spring seat 43 is formed in an annular shape so as to extend radially inward from an end of the control sleeve body 41 opposite to the sleeve locking portion 42. The locking portion 44 is formed in an annular shape, and is provided to have an outer edge fitted in an inner peripheral wall of the control sleeve body 41. The sleeve locking portion 42 is located between the spring seat 43 and the locking portion 44.

A sleeve recess 411, a sleeve port 400, a sleeve port 401, a sleeve port 402, and a sleeve port 403 are formed in the control sleeve body 41. The sleeve recess 411 is formed in an annular shape so as to be recessed radially inward from the outer peripheral wall of the control sleeve body 41.

The sleeve port 400 is formed to connect the sleeve recess 411 and the inner peripheral wall of the control sleeve body 41. The sleeve port 401 is formed to connect the outer peripheral wall and the inner peripheral wall of the control sleeve body 41 between the sleeve locking portion 42 and the sleeve recess 411. The sleeve port 402 is formed to connect the outer peripheral wall and the inner peripheral wall of the control sleeve body 41 on a side opposite to the sleeve port 401 with respect to the sleeve recess 411. The sleeve port 403 is formed to connect the outer peripheral wall and the inner peripheral wall of the control sleeve body 41 between the sleeve port 402 and the spring seat 43.

The control sleeve 40 is provided in the vane rotor 30 so as to fit in the rotor hole 300. Here, in the control sleeve 40, the sleeve locking portion 42 is locked to an end of the boss 31 opposite to the camshaft 3, so that movement in the axial direction toward the camshaft 3 is restricted.

The control spool 50 includes a control spool body 51, a sealing portion 52, and the like. The control spool body 51 is formed in a substantially cylindrical shape. The sealing portion 52 is formed integrally with the control spool body 51 so as to close one end of the control spool body 51. The sealing portion 52 includes a sealing portion body 521 and a projecting portion 522. The sealing portion body 521 closes the one end of the control spool body 51. The projecting portion 522 is formed in a substantially columnar shape so as to project in the axial direction from the sealing portion body 521.

A spool recess 511, a spool recess 512, a spool recess 513, a spool port 501, and a spool port 502 are formed in the control spool body 51. The spool recess 511 is formed in an annular shape so as to be recessed radially inward from an outer peripheral wall of the control spool body 51. The spool recess 512 is formed in an annular shape so as to be recessed radially inward from the outer peripheral wall of the control spool body 51, and the spool recess 511 is located between the sealing portion 52 and the spool recess 512. The spool recess 513 is formed in an annular shape so as to be recessed radially inward from the outer peripheral wall of the control spool body 51 between the spool recess 511 and the sealing portion 52.

The spool port 501 is formed to connect the spool recess 512 and an inner peripheral wall of the control spool body 51. The spool port 502 is formed to connect the spool recess 513 and the inner peripheral wall of the control spool body 51.

The control spool 50 is provided to reciprocate in the axial direction inside the control sleeve body 41. Here, when the control spool 50 reciprocates in the axial direction inside the control sleeve body 41, the outer peripheral wall of the control spool body 51 and the inner peripheral wall of the control sleeve body 41 slide on each other. That is, the control spool 50 and the control sleeve 40 correspond to a "precision sliding component". An end of the control spool body 51 adjacent to the sealing portion 52 can abut on the locking portion 44. When abutting on the locking portion 44, the control spool 50 is restricted from moving in the axial direction away from the spring seat 43.

The control spring 14 is, for example, a coil spring, and is provided between an end of the control spool body 51 opposite to the sealing portion 52 and the spring seat 43 of the control sleeve 40. The control spring 14 biases the control spool 50 in a direction away from the spring seat 43. Thus, the end of the control spool body 51 adjacent to the sealing portion 52 is pressed against the locking portion 44.

The vane rotor 30 has a retard oil passage portion 301, an advance oil passage portion 302, a rotor annular recess 312, and a housing hole 321. The retard oil passage portion 301 is formed in the boss 31 so as to connect the rotor hole 300 and the retard chamber 201. The advance oil passage portion 302 is formed in the boss 31 so as to connect the rotor hole 300 and the advance chamber 202. The rotor annular recess 312 is formed in an annular shape so as to be recessed radially outward from the rotor hole 300. The housing hole 321 is formed to be recessed in the axial direction from an end surface of one of the four vanes 32 adjacent to the plate portion 223.

The oil passage portion 61 is formed to be recessed in the axial direction from a bottom surface of the rotor recess 310 of the vane rotor 30. The oil passage portion 61 is formed in a substantially cylindrical shape. An escape portion 63 is formed in the vane rotor 30. The escape portion 63 is formed to be recessed radially inward of the boss 31, that is, toward the rotor hole 300 from an inner peripheral wall of the oil passage portion 61.

The recess hole 62 is formed between the rotor annular recess 312 and the oil passage portion 61 by connecting the rotor annular recess 312 to the escape portion 63 and the oil passage portion 61. Consequently, the oil passage portion 61 and the rotor hole 300 communicate with each other via the recess hole 62.

Figure 3:
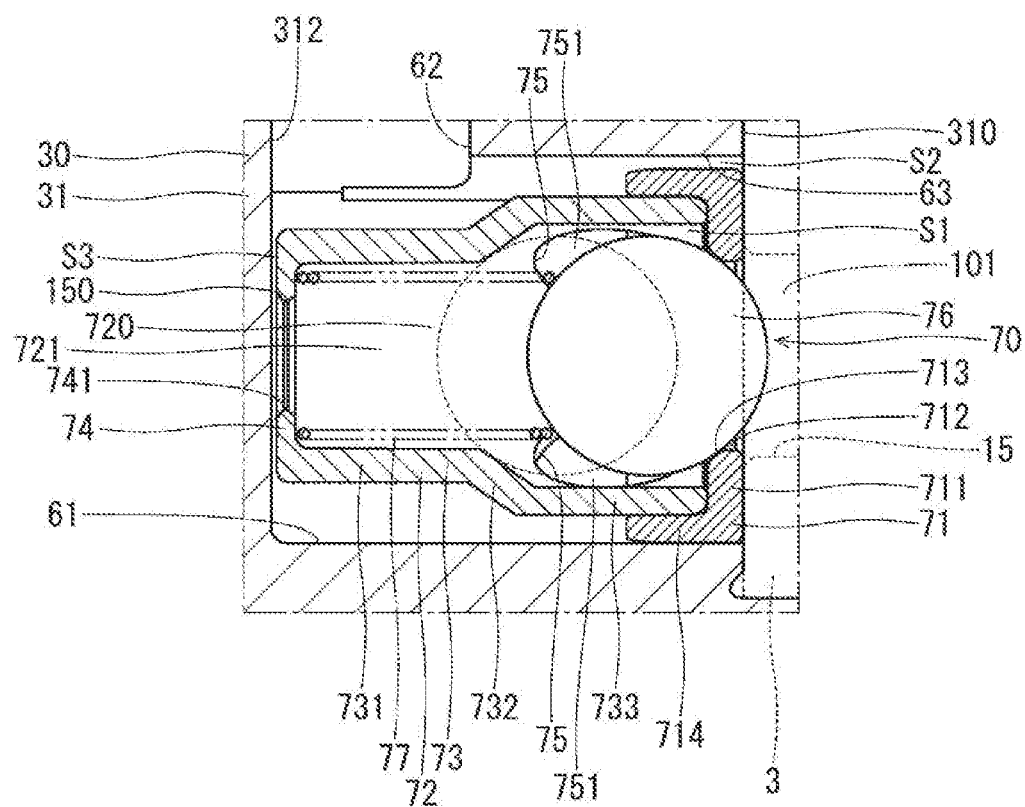
FIG. 3 is a cross-sectional view illustrating a check valve part of the valve timing adjusting device according to the first embodiment and the vicinity thereof.

As illustrated in FIG. 3, the recess hole 62 is formed so as to be connected to a radially outer side of the oil passage portion 61 opposite to the camshaft 3.

A supply hole 15 is formed in the camshaft 3. The supply hole 15 is formed so as to open in an end surface of the camshaft 3 adjacent to the vane rotor 30. The supply hole 15 is formed at a position communicable with the oil passage portion 61. The oil pump 8 as a "hydraulic oil supply source" is connected to an end of the supply hole 15 opposite to the oil passage portion 61.

The oil pump 8 pumps up hydraulic oil stored in an oil pan 7 as an "oil discharging portion" and pressure-feeds the hydraulic oil to the supply hole 15. Consequently, the hydraulic oil can flow to the retard chamber 201 via the supply hole 15, the oil passage portion 61, the recess hole 62, the sleeve recess 411, the sleeve port 400, the inside of the control sleeve body 41, the sleeve port 401, and the retard oil passage portion 301. The hydraulic oil can flow to the advance chamber 202 via the supply hole 15, the oil passage portion 61, the recess hole 62, the sleeve recess 411, the sleeve port 400, the inside of the control sleeve body 41, the sleeve port 402, and the advance oil passage portion 302. Thus, the oil supply passage 101 is formed between the oil pump 8 and the retard chamber 201 and the advance chamber 202. The oil passage portion 61 forms a part of the oil supply passage 101 inside. The recess hole 62 is connected to a radially outer side of the oil passage portion 61 and forms a part of the oil supply passage 101 on an inner side.

The check valve part 70 is provided in the oil passage portion 61. That is, the check valve part 70 is provided in the oil supply passage 101. The check valve part 70 allows the hydraulic oil to flow from the oil pump 8 to the retard chamber 201 or the advance chamber 202, and restricts the hydraulic oil from flowing from the retard chamber 201 or the advance chamber 202 to the oil pump 8. The configuration of the check valve part 70 will be described in detail later.

As illustrated in FIG. 1, a linear solenoid 9 is provided opposite to the spring seat 43 with respect to the projecting portion 522 of the control spool 50. The linear solenoid 9 is provided so as to abut on an end of the projecting portion 522. The linear solenoid 9 presses the control spool 50 toward the camshaft 3 against a biasing force of the control spring 14 by energization. Thus, the position of the control spool 50 in the axial direction with respect to the control sleeve 40 changes.

An electronic control unit (hereinafter, referred to as "ECU") not illustrated is connected to the linear solenoid 9. The ECU includes, for example, an arithmetic unit such as a CPU, a storage unit such as a memory, an input/output unit such as an I/O, and the like, and controls operation of each device and each piece of equipment of the vehicle on the basis of information from various sensors provided in the vehicle, and the like. The ECU controls energization to the linear solenoid 9 according to an operation status of the engine 1 and the like, and controls operation of the valve timing adjusting device 10.

When the control spool 50 is at the position abutting on the locking portion 44 (see FIG. 1), the spool recess 511 and the sleeve port 401 communicate with each other. Thus, the hydraulic oil pressure-fed from the oil pump 8 can flow into the retard chamber 201 via the supply hole 15, the oil passage portion 61, the recess hole 62, the sleeve recess 411, the sleeve port 400, the spool recess 511, the sleeve port 401, and the retard oil passage portion 301. At this time, the sleeve port 402 and the spool recess 512 communicate with each other. Thus, the hydraulic oil in the advance chamber 202 can flow to the oil pan 7 via the advance oil passage portion 302, the sleeve port 402, the spool recess 512, the spool port 501, and the sleeve port 403.

When the control spool 50 is located apart from the locking portion 44 and the outer peripheral wall of the control spool body 51 is in a position to close the sleeve port 401 and the sleeve port 402, the spool recess 511 and the sleeve port 401 and the sleeve port 402 do not communicate with each other. Thus, the hydraulic oil pressure-fed from the oil pump 8 cannot flow into the retard chamber 201 and the advance chamber 202. The hydraulic oil in the retard chamber 201 and the advance chamber 202 cannot flow to the oil pan 7.

When the control spool 50 is located further apart from the locking portion 44, the spool recess 511 and the sleeve port 402 communicate with each other. Thus, the hydraulic oil pressure-fed from the oil pump 8 can flow into the advance chamber 202 via the supply hole 15, the oil passage portion 61, the recess hole 62, the sleeve recess 411, the sleeve port 400, the spool recess 511, the sleeve port 402, and the advance oil passage portion 302. At this time, the sleeve port 401 and the spool recess 513 communicate with each other. Thus, the hydraulic oil in the retard chamber 201 can flow to the oil pan 7 via the retard oil passage portion 301, the sleeve port 401, the spool recess 513, the spool port 502, and the sleeve port 403.

Figure 2:
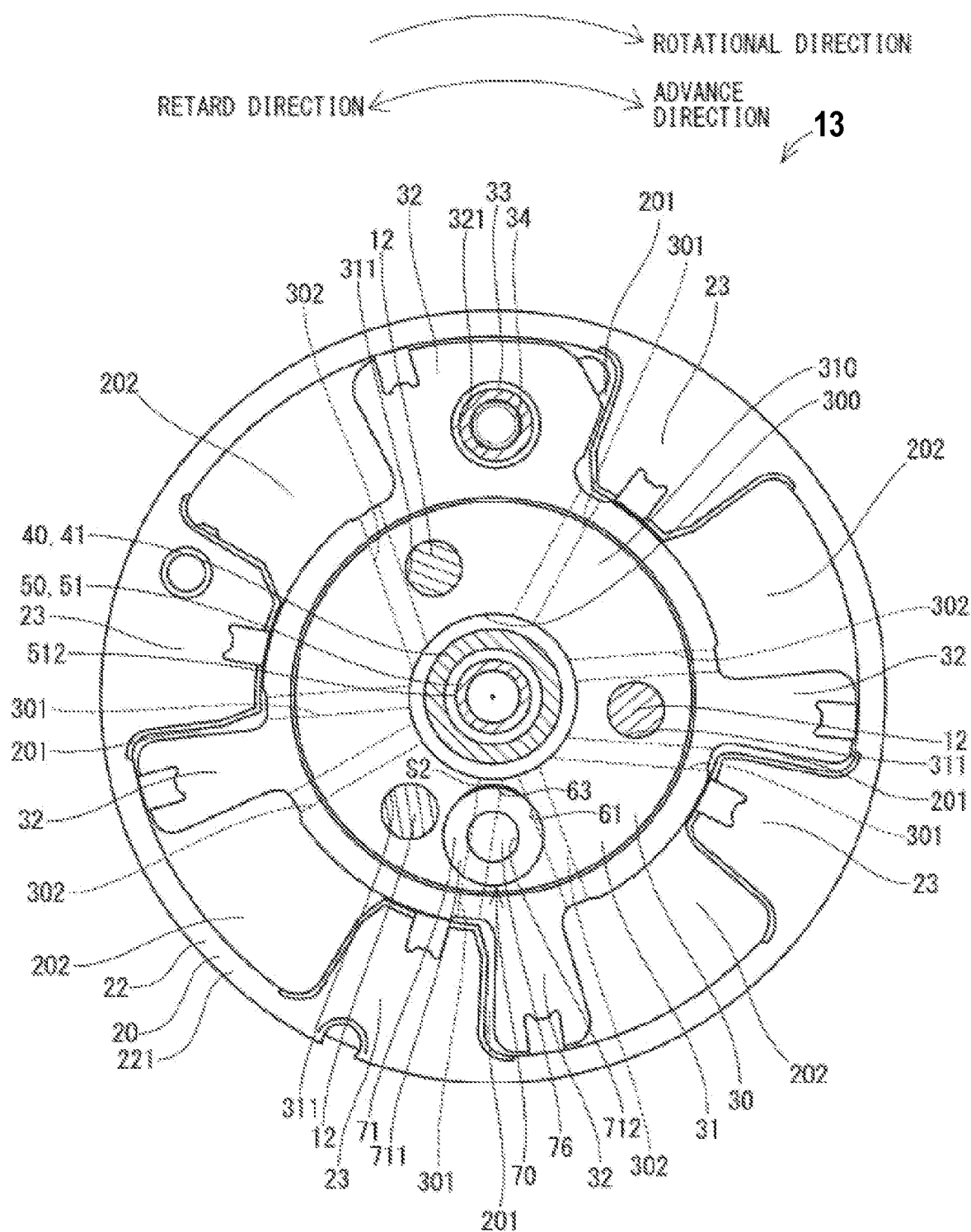
FIG. 2 is a cross-sectional view taken along line II-II of FIG. 1.

The present embodiment further includes a lock pin 33 (see FIGS. 1 and 2). The lock pin 33 is formed in a bottomed cylindrical shape, and is housed in the housing hole 321 formed in the vane 32 so as to be capable of reciprocating in the axial direction. A spring 34 is provided inside the lock pin 33. The spring 34 biases the lock pin 33 toward the plate portion 223. A fitting recess 25 is formed on the plate portion 223 adjacent to the vane 32.

The lock pin 33 can be fitted into the fitting recess 25 when the vane rotor 30 is at a full advance position with respect to the housing 20. When the lock pin 33 is fitted into the fitting recess 25, the relative rotation of the vane rotor 30 with respect to the housing 20 is restricted. On the other hand, when the lock pin 33 is not fitted into the fitting recess 25, relative rotation of the vane rotor 30 with respect to the housing 20 is allowed.

A pin control oil passage (not illustrated) in communication with the retard chamber 201 is formed between the housing hole 321 of the vane 32 and the retard chamber 201. The pressure of the hydraulic oil flowing into the pin control oil passage from the retard chamber 201 acts in a direction in which the lock pin 33 comes out of the fitting recess 25 against a biasing force of the spring 34.

In the valve timing adjusting device 10 configured as described above, when the hydraulic oil is supplied to the retard chamber 201, the hydraulic oil flows into the pin control oil passage, and the lock pin 33 comes out of the fitting recess 25, thereby allowing relative rotation of the vane rotor 30 with respect to the housing 20.

Next, operation of the valve timing adjusting device 10 will be described. The ECU controls driving of the linear solenoid 9 and controls operation of the valve timing adjusting device 10.

For example, when the ignition switch of the vehicle is turned off to stop the engine 1, the energization to the linear solenoid 9 is also stopped. Thus, the control spool 50 is held at a position where the control spool body 51 abuts on the locking portion 44 by the biasing force of the control spring 14 (see FIG. 1). At this time, the advance chamber 202 communicates with the oil pan 7. Thus, the hydraulic oil in the advance chamber 202 is discharged to the oil pan 7. Consequently, the advance chamber 202 has a low pressure.

At this time, the oil pump 8 communicates with the retard chamber 201 via the oil supply passage 101 and the check valve part 70.

When the engine 1 is stopped, the operation of the oil pump 8 is also stopped, and thus the hydraulic oil is not supplied to the retard chamber 201 and the advance chamber 202. The vane rotor 30 is located at the full advance position.

At this time, when the vane rotor 30 is held at the full advance position, the lock pin 33 is fitted into the fitting recess 25 by the biasing force of the spring 34. Consequently, the relative rotation of the vane rotor 30 with respect to the housing 20 is restricted.

Next, when the ignition switch of the vehicle is turned on to start the engine 1, the oil pump 8 also operates. Thus, the hydraulic oil discharged from the oil pump 8 is supplied to the retard chamber 201 via the oil supply passage 101 and the check valve part 70. Consequently, the retard chamber 201 has a high pressure.

At this time, although the hydraulic oil is supplied from the retard chamber 201 to the pin control oil passage, the pressure of the pin control oil passage is low at the initial stage of cranking, and the lock pin 33 is in a state of being fitted into the fitting recess 25. Thus, fluttering of the vane rotor 30 due to alternating torque can be suppressed.

Thereafter, when the pressure in the retard chamber 201 and the pin control oil passage increases, the lock pin 33 comes out of the fitting recess 25, and the relative rotation of the vane rotor 30 with respect to the housing 20 is allowed. At this time, the advance chamber 202 is maintained in a low pressure state.

Thus, the vane rotor 30 rotates relative to the housing 20 in the retard direction. Consequently, the vane rotor 30 is located at a full retard position, and the valve timing of the intake valve 4 is controlled to a full retard phase.

Next, for example, when the engine 1 shifts from the idling operation to the steady operation, a predetermined electric power is supplied to the linear solenoid 9 by the ECU. Thus, the linear solenoid 9 presses the control spool 50 toward the camshaft 3 against the biasing force of the control spring 14. When the control spool 50 is pressed against the linear solenoid 9, the control spool 50 is separated from the locking portion 44, and the outer peripheral wall of the control spool body 51 closes the sleeve port 401 and the sleeve port 402.

Thus, the hydraulic oil in the retard chamber 201 and the advance chamber 202 is not discharged to the oil pan 7, and the supply of the hydraulic oil from the oil pump 8 to the retard chamber 201 and the advance chamber 202 is also restricted.

Thus, the vane rotor 30 is held, for example, at an intermediate position between full advance position and full retard. Accordingly, the valve timing of the intake valve 4 is controlled to an intermediate phase between full advance and full retard. Therefore, it is possible to stabilize the rotation of the engine 1 and improve fuel consumption during steady operation.

Next, for example, when the engine 1 shifts from the steady operation to the high rotation load region, a larger electric power is supplied to the linear solenoid 9 by the ECU. Thus, the control spool 50 is further pressed by the linear solenoid 9, and the oil pump 8 communicates with the advance chamber 202 via the oil supply passage 101 and the check valve part 70.

At this time, the retard chamber 201 communicates with the oil pan 7. Thus, the hydraulic oil in the retard chamber 201 is discharged to the oil pan 7. Consequently, the retard chamber 201 has a low pressure.

On the other hand, the hydraulic oil discharged from the oil pump 8 is supplied to the advance chamber 202 via the oil supply passage 101 and the check valve part 70. As a result, the advance chamber 202 has a high pressure.

Thus, the vane rotor 30 rotates relative to the housing 20 in the advance direction. Consequently, the vane rotor 30 is located at the full advance position, and the valve timing of the intake valve 4 is controlled to the most advance phase. Therefore, a valve overlap of the exhaust valve 5 increases, filling efficiency of intake air increases, and output torque of the engine 1 can be improved.

In this manner, the ECU controls energization of the linear solenoid 9 according to the operating state of the engine 1, and controls the position of the control spool 50 in the axial direction with respect to the control sleeve 40 of the hydraulic oil control unit 11. Consequently, the phase conversion unit 13 can be controlled to control the rotation phase of the camshaft 3 with respect to the crankshaft 2 to an optimum phase.

The check valve part 70 allows the flow of the hydraulic oil during forward flow in which the hydraulic oil flows from the oil pump 8 to the retard chamber 201 or the advance chamber 202 in the oil supply passage 101. The check valve part 70 restricts the flow of the hydraulic oil during backward flow in which the hydraulic oil flows from the retard chamber 201 or the advance chamber 202 to the oil pump 8 in the oil supply passage 101. Thus, the hydraulic oil can be efficiently supplied from the oil pump 8 to the retard chamber 201 or the advance chamber 202.

Next, a configuration of the check valve part 70 will be described in detail. As illustrated in FIG. 3, the check valve part 70 includes a valve seat portion 71, a sleeve 72, lateral holes 75, a valve body 76, and a spring 77.

The valve seat portion 71 is provided in the oil passage portion 61 and forms a valve seat 713 at the center. The sleeve 72 is formed in a cylindrical shape and has one end connected to the valve seat portion 71. The lateral holes 75 are formed to connect an inner peripheral wall and an outer peripheral wall of the sleeve 72, and communicate an internal space 720 of the sleeve 72 with the outside of the sleeve 72. The valve body 76 is provided so as to be capable of separating from the valve seat 713 or abutting on the valve seat 713 inside the sleeve 72.

More specifically, the valve seat portion 71 includes a valve seat body 711, a valve seat hole 712, the valve seat 713, and a valve seat cylindrical portion 714. The valve seat body 711 is formed in a substantially disk shape. The valve seat hole 712 is formed in a circular shape so as to penetrate the center of the valve seat body 711 in the thickness direction. The valve seat 713 is formed in a tapered shape around the valve seat hole 712 on one end surface of the valve seat body 711. The valve seat cylindrical portion 714 is formed in a substantially cylindrical shape extending in the axial direction from an outer edge of one end surface of the valve seat body 711. The valve seat body 711 and the valve seat cylindrical portion 714 are integrally formed by, for example, metal.

The valve seat portion 71 is press-fitted into the oil passage portion 61. Thus, an outer peripheral wall of the valve seat portion 71, that is, an outer peripheral wall of the valve seat body 711 and an outer peripheral wall of the valve seat cylindrical portion 714 are fitted to the inner peripheral wall of the oil passage portion 61.

Figure 4:
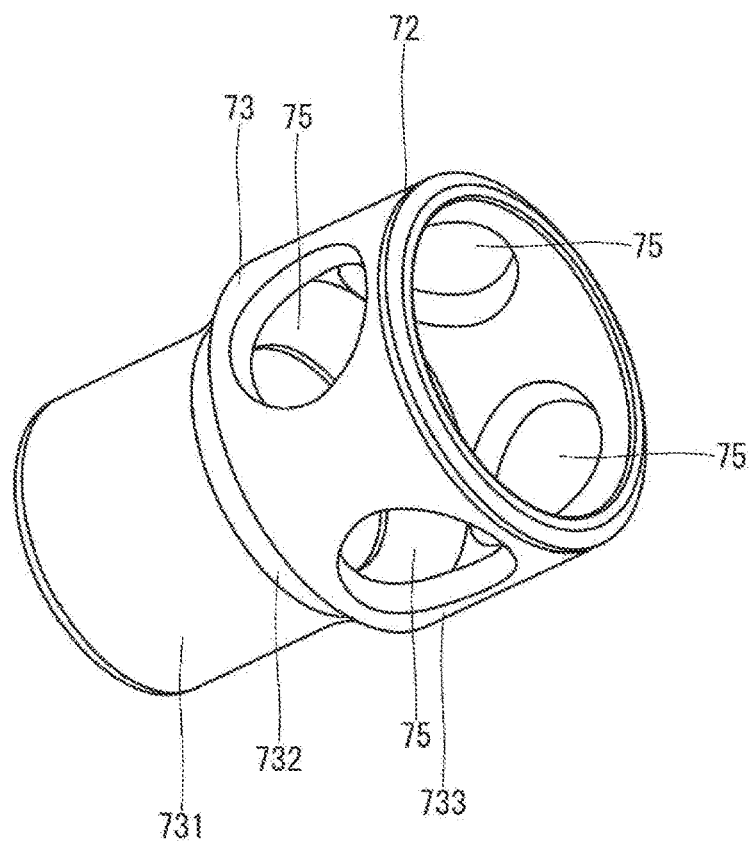
FIG. 4 is a perspective view illustrating a sleeve of the check valve part of the valve timing adjusting device according to the first embodiment.
Figure 5:
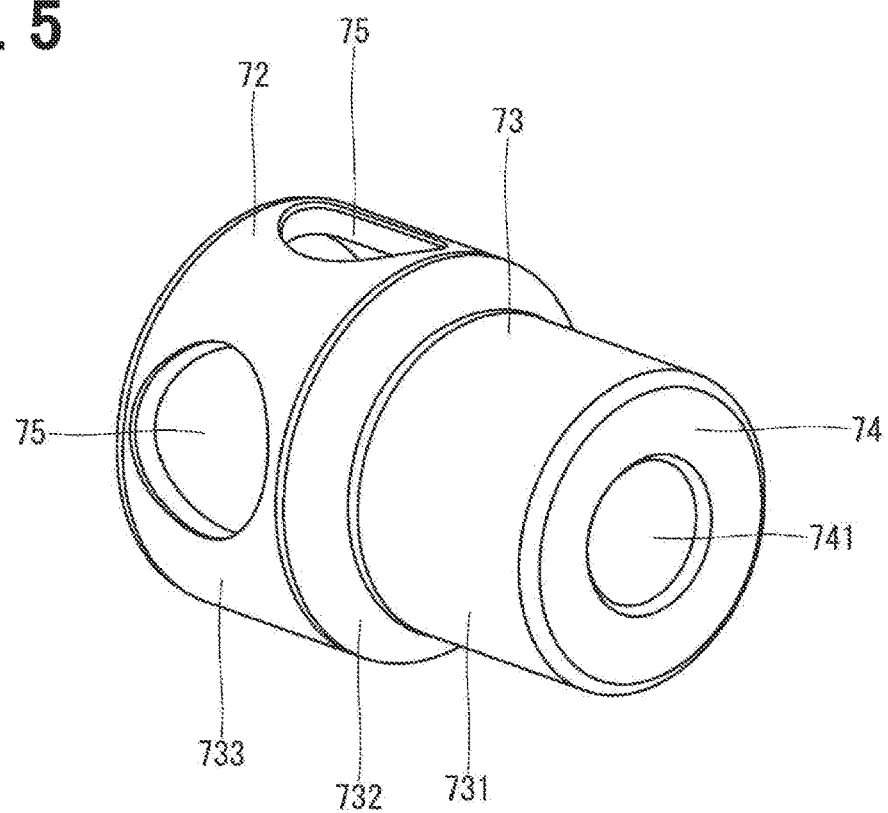
FIG. 5 is a perspective view illustrating the sleeve of the check valve part of the valve timing adjusting device according to the first embodiment.
Figure 6:
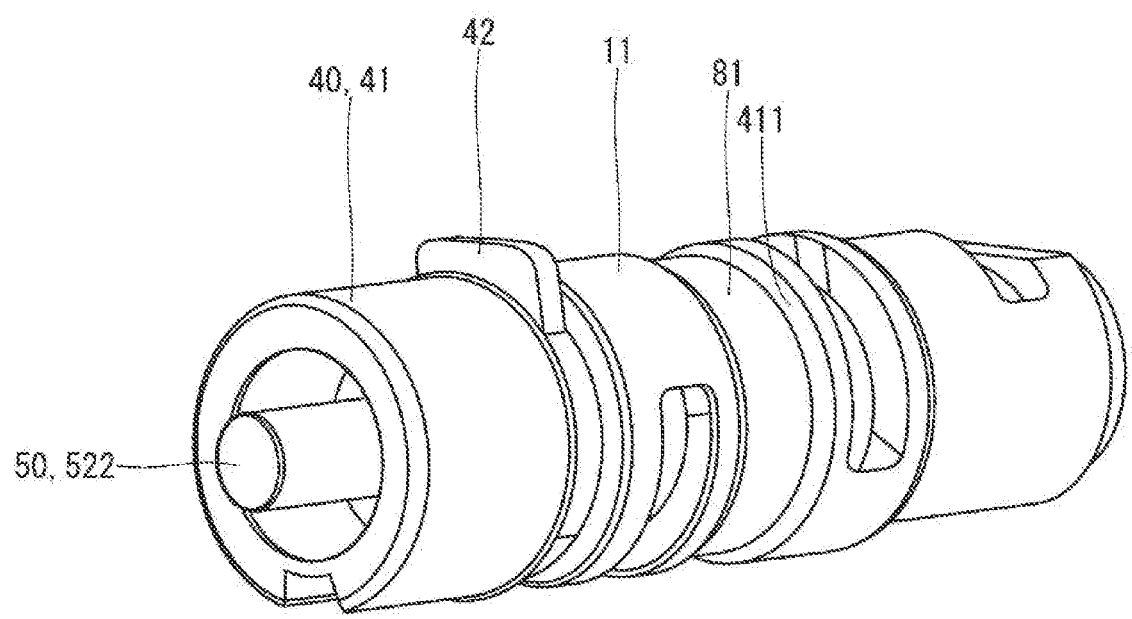
FIG. 6 is a perspective view illustrating a hydraulic oil control unit and a filter of the valve timing adjusting device according to the first embodiment.

As illustrated in FIGS. 3 to 5, the sleeve 72 is made of metal, for example, and includes a sleeve body 73 and a sleeve bottom portion 74. The sleeve body 73 is formed in a substantially cylindrical shape. The sleeve bottom portion 74 is formed integrally with the sleeve body 73 so as to close one end of the sleeve body 73. A substantially circular back pressure hole 741 penetrating the center of the sleeve bottom portion 74 in the thickness direction is formed in the sleeve bottom portion 74.

The sleeve body 73 includes a sleeve small diameter portion 731, a sleeve connection portion 732, and a sleeve large diameter portion 733. The sleeve small diameter portion 731 is formed in a substantially cylindrical shape so as to extend in the axial direction from an outer edge of the sleeve bottom portion 74. The sleeve connection portion 732 is formed in a cylindrical shape that opens forward so as to extend in the axial direction and radially outward from an end of the sleeve small diameter portion 731 opposite to the sleeve bottom portion 74. Thus, the inner peripheral wall of the sleeve connection portion 732 is formed in a tapered shape. The sleeve large diameter portion 733 is formed in a substantially cylindrical shape so as to extend in the axial direction from an end of the sleeve connection portion 732 opposite to the sleeve small diameter portion 731. Here, an inner diameter and an outer diameter of the sleeve large diameter portion 733 are larger than an inner diameter and an outer diameter of the sleeve small diameter portion 731.

The sleeve 72 is integrally assembled with the valve seat portion 71 by connecting an end of the sleeve body 73 adjacent to the sleeve large diameter portion 733 into the valve seat cylindrical portion 714 by press-fitting.

The lateral holes 75 are formed in a substantially circular shape so as to connect the inner peripheral wall and the outer peripheral wall of the sleeve large diameter portion 733. Four lateral holes 75 are formed at equal intervals in the circumferential direction of the sleeve large diameter portion 733.

Since the end of the sleeve body 73 adjacent to the sleeve large diameter portion 733 is press-fitted into the valve seat cylindrical portion 714, the lateral holes 75 are partially closed by the valve seat cylindrical portion 714. Thus, openings 751 exposed to the outside of the sleeve 72 are formed in the lateral holes 75 (see FIG. 3).

The valve body 76 is formed of, for example, metal in a spherical shape. The valve body 76 is provided inside the sleeve large diameter portion 733. An outer diameter of the valve body 76 is larger than an inner diameter of the valve seat hole 712 and an inner diameter of the valve seat 713. The outer diameter of the valve body 76 is smaller than the inner diameter of the sleeve large diameter portion 733 and larger than the inner diameter of the sleeve small diameter portion 731. Thus, a gap 51 is formed between the valve body 76 and the inner peripheral wall of the sleeve large diameter portion 733. The valve body 76 can abut on the valve seat 713 or an inner peripheral wall of the sleeve connection portion 732.

The valve body 76 is movable in a valve opening direction or a valve closing direction between the valve seat 713 and the sleeve connection portion 732 inside the sleeve body 73. Here, the "valve opening direction" means a direction from the sleeve connection portion 732 toward the valve seat 713 along the axial direction of the sleeve 72, and the "valve closing direction" means a direction from the valve seat 713 toward the sleeve connection portion 732 along the axial direction of the sleeve 72. When the valve body 76 abuts on the valve seat 713, the movement in the valve closing direction is restricted. When the valve body 76 abuts on the inner peripheral wall of the sleeve connection portion 732 (see the broken line in FIG. 3), the movement in the valve opening direction is restricted.

The spring 77 is, for example, a coil spring, and is provided between the valve body 76 and the sleeve bottom portion 74. An outer diameter of the spring 77 is smaller than the outer diameter of the valve body 76 and the inner diameter of the sleeve small diameter portion 731. One end of the spring 77 abuts on the valve body 76, and the other end abuts on the sleeve bottom portion 74. The spring 77 is compressed in the axial direction between the valve body 76 and the sleeve bottom portion 74. Thus, the spring 77 biases the valve body 76 in the valve closing direction. Consequently, the valve body 76 is pressed against the valve seat 713.

The check valve part 70 is provided in the oil passage portion 61 by inserting the sleeve 72 into the oil passage portion 61 from the end of the sleeve small diameter portion 731 and press-fitting the valve seat portion 71 into the oil passage portion 61.

A gap S2 is formed between the outer peripheral wall of the valve seat portion 71 and the escape portion 63 (see FIGS. 2 and 3). If the valve seat portion 71 is press-fitted into the oil passage portion 61, due to the gap S2, the inner peripheral wall of the rotor hole 300 located on the radially outer side of the valve seat portion 71 and the inner peripheral wall of the control sleeve body 41 can be suppressed from being deformed radially inward of the rotor hole 300. Thus, it is possible to keep smooth movement of the control spool 50 in the axial direction inside the control sleeve 40 due to the deformation.

The end surface of the valve seat body 711 opposite to the valve seat cylindrical portion 714 abuts on the end surface of the camshaft 3. A gap S3 is formed between an end surface of the sleeve bottom portion 74 opposite to the sleeve body 73 and the bottom surface of the oil passage portion 61. Thus, a back pressure oil passage 150 is formed, which allows a space 721 opposite to the valve seat 713 with respect to the valve body 76 in the internal space 720 of the sleeve 72 to communicate with the outside of the sleeve 72. The back pressure oil passage 150 allows the space 721 and the lateral holes 75 to communicate with each other.

In the present embodiment, during the forward flow in which the hydraulic oil flows from the oil pump 8 to the retard chamber 201 or the advance chamber 202 via the oil supply passage 101, the valve body 76 moves in the valve opening direction against a biasing force of the spring 77 and separates from the valve seat 713. Consequently, the valve body 76 of the check valve part 70 is opened. When the check valve part 70 is opened, the hydraulic oil in the supply hole 15 flows toward the recess hole 62 via the valve seat hole 712, the valve seat 713, and the openings 751 of the lateral holes 75.

During the backward flow in which the hydraulic oil flows from the retard chamber 201 or the advance chamber 202 to the oil pump 8 via the oil supply passage 101, the valve body 76 separated from the valve seat 713 moves in the valve closing direction by fluid force of the hydraulic oil and the biasing force of the spring 77, and abuts on the valve seat 713. Consequently, the valve body 76 of the check valve part 70 is closed. When the check valve part 70 is closed, the flow of the hydraulic oil from the retard chamber 201 or advance chamber 202 to the oil pump 8 is restricted.

As illustrated in FIG. 3, in the present embodiment, the check valve part 70 includes the valve seat portion 71, which is a member press-fitted into the oil passage portion 61.

The filter 81 is provided on the downstream side with respect to the valve seat portion 71 in the oil supply passage 101 and can collect foreign matter in the oil supply passage 101.

More specifically, the filter 81 is formed in a substantially cylindrical shape by winding a long mesh-like member in a longitudinal direction. The filter 81 is provided in the sleeve recess 411 so as to close the sleeve port 400 (see FIGS. 1 and 6). That is, the filter 81 is provided on the downstream side of the valve seat portion 71 in a flow of the hydraulic oil during the forward flow in the oil supply passage 101.

As described above, in the present embodiment, the check valve part 70 includes the valve seat portion 71 as a "press-fit member" which is a member press-fitted into the oil passage portion 61. The check valve part 70 allows the flow of the hydraulic oil from the oil pump 8 to the retard chamber 201 or the advance chamber 202 as a "hydraulic chamber", and restricts the flow of the hydraulic oil from the retard chamber 201 or the advance chamber 202 to the oil pump 8.

The filter 81 is provided on the downstream side with respect to the valve seat portion 71 in the oil supply passage 101 and can collect foreign matter in the oil supply passage 101. Accordingly, even if a press-fit burr or a press-fit residue is generated when the valve seat portion 71 is press-fitted into the oil passage portion 61, the press-fitted burr or press-fitted residue can be collected by the filter 81 on the downstream side with respect to the valve seat portion 71. Thus, it is possible to suppress the press-fit burr or the press-fit residue from entering the sliding gap of the precision sliding components such as the control spool 50, the control sleeve 40, the vane rotor 30, the housing 20, and the like provided downstream of the valve seat portion 71. Therefore, it is possible to suppress abnormal wear of components due to the press-fit burr or the press-fit residue, and engagement of the press-fit burr or the press-fit residue with the components.

In the present embodiment, the check valve part 70 includes the valve seat portion 71 as the "press-fit member" in which the valve seat 713 is formed, and the valve body 76 provided so as to be capable of being separated from the valve seat 713 or abutting on the valve seat 713.

The present embodiment concretely specifies the "press-fit member" as the valve seat portion 71. In the present embodiment, when the valve seat portion 71 is used as the "press-fit member", the above effect can be achieved by the filter 81.

In the present embodiment, the oil passage portion 61 is formed so as to open to the outside of the vane rotor 30 of the phase conversion unit 13. The valve seat portion 71 as the "press-fit member" is press-fitted into the oil passage portion 61 so as to close the opening of the oil passage portion 61.

The present embodiment concretely specifies a portion to which the valve seat portion 71 as the "press-fit member" is press-fitted.

Second Embodiment

Figure 7:
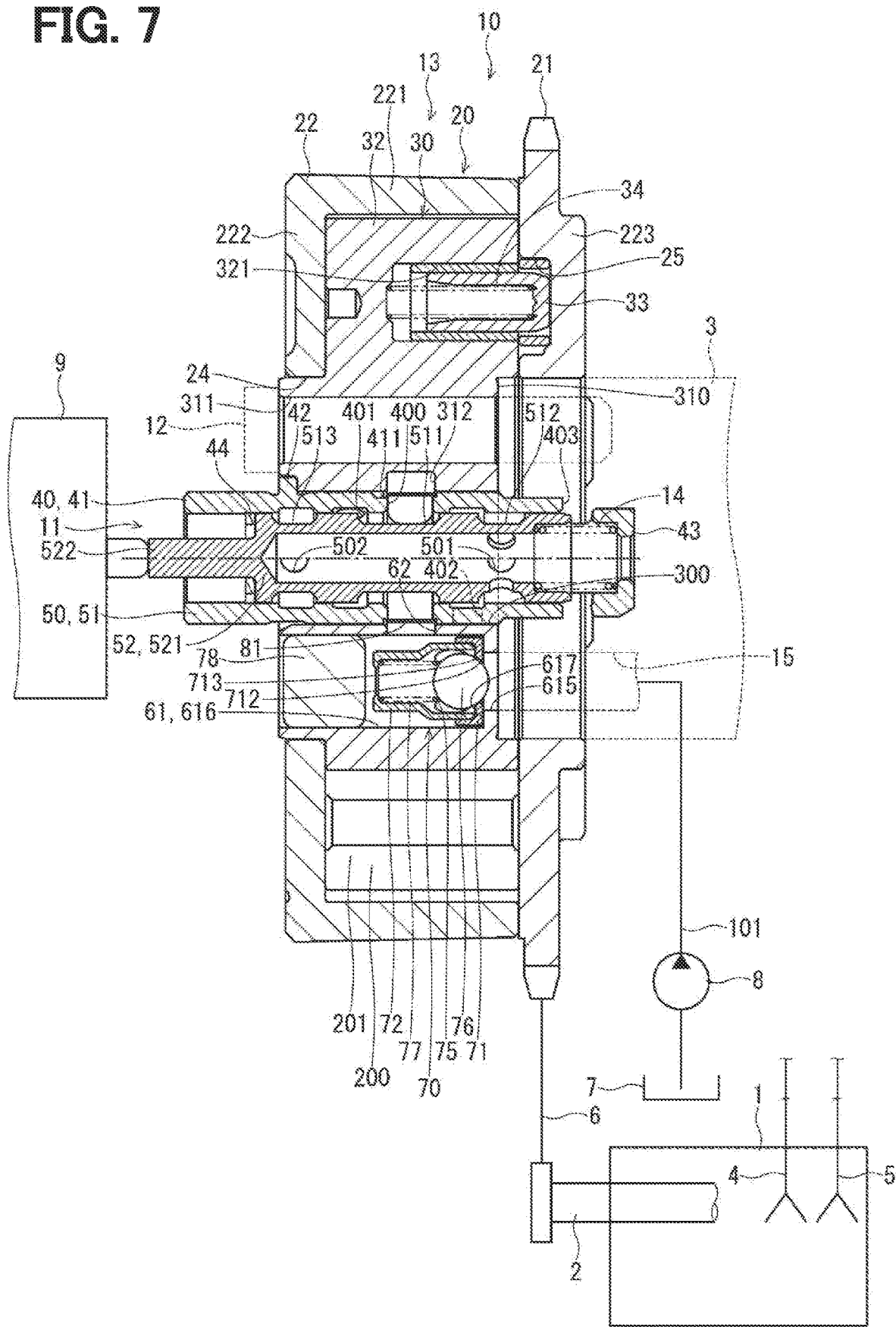
FIG. 7 is a cross-sectional view illustrating a valve timing adjusting device according to a second embodiment.

FIG. 7 illustrates a valve timing adjusting device according to a second embodiment. The second embodiment is different from the first embodiment in the configurations of the oil passage portion 61, the check valve part 70, and the like.

In the present embodiment, the oil passage portion 61 includes a small diameter portion 615 and a large diameter portion 616. The small diameter portion 615 is formed in a substantially cylindrical shape so as to extend from a position corresponding to the supply hole 15 on the bottom surface of the rotor recess 310 away from the camshaft 3.

The large diameter portion 616 is formed in a substantially cylindrical shape so as to extend from an end of the small diameter portion 615 opposite to the camshaft 3 away from the camshaft 3. An end of the large diameter portion 616 opposite to the small diameter portion 615 is opened in the end surface of the boss 31 of the vane rotor 30 opposite to the camshaft 3. The large diameter portion 616 is formed coaxially with the small diameter portion 615. An inner diameter of the large diameter portion 616 is larger than an inner diameter of the small diameter portion 615. Thus, a stepped surface 617 having a substantially annular planar shape is formed between the small diameter portion 615 and the large diameter portion 616.

An outer diameter of the valve seat portion 71 is larger than the inner diameter of the small diameter portion 615 of the oil passage portion 61 and smaller than the inner diameter of the large diameter portion 616. The valve seat portion 71 is provided inside the large diameter portion 616 so as to be capable of abutting on the stepped surface 617. Here, the valve seat portion 71 is not press-fitted into the large diameter portion 616.

The check valve part 70 further includes a sealing member 78. The sealing member 78 is formed in a substantially columnar shape by, for example, metal. The sealing member 78 is press-fitted into the large diameter portion 616 so as to close the opening of the large diameter portion 616 of the oil passage portion 61 opposite to the small diameter portion 615. Thus, leakage of the hydraulic oil from the oil passage portion 61 can be suppressed.

The filter 81 is provided on the downstream side of the sealing member 78 in a flow of the hydraulic oil during the forward flow in the oil supply passage 101.

As described above, in the present embodiment, the check valve part 70 includes the sealing member 78 as the "press-fit member" which is a member press-fitted into the oil passage portion 61.

The filter 81 is provided on the downstream side with respect to the sealing member 78 in the oil supply passage 101 and can collect foreign matter in the oil supply passage 101. Accordingly, even if a press-fit burr or a press-fit residue is generated when the sealing member 78 is press-fitted into the oil passage portion 61, the press-fit burr or the press-fit residue can be collected by the filter 81 on the downstream side with respect to the sealing member 78. Thus, it is possible to suppress the press-fit burr or the press-fit residue from entering the sliding gap of the precision sliding components such as the control spool 50, the control sleeve 40, the vane rotor 30, the housing 20, and the like provided downstream of the sealing member 78. Therefore, it is possible to suppress abnormal wear of components due to the press-fit burr or the press-fit residue, and engagement of the press-fit burr or the press-fit residue with the components.

In the present embodiment, the oil passage portion 61 is formed so as to open to the outside of the vane rotor 30 of the phase conversion unit 13. The sealing member 78 as the "press-fit member" is press-fitted into the oil passage portion 61 so as to close the opening of the oil passage portion 61.

The present embodiment concretely specifies a portion where the sealing member 78 as the "press-fit member" is press-fitted.

Third Embodiment

Figure 8:
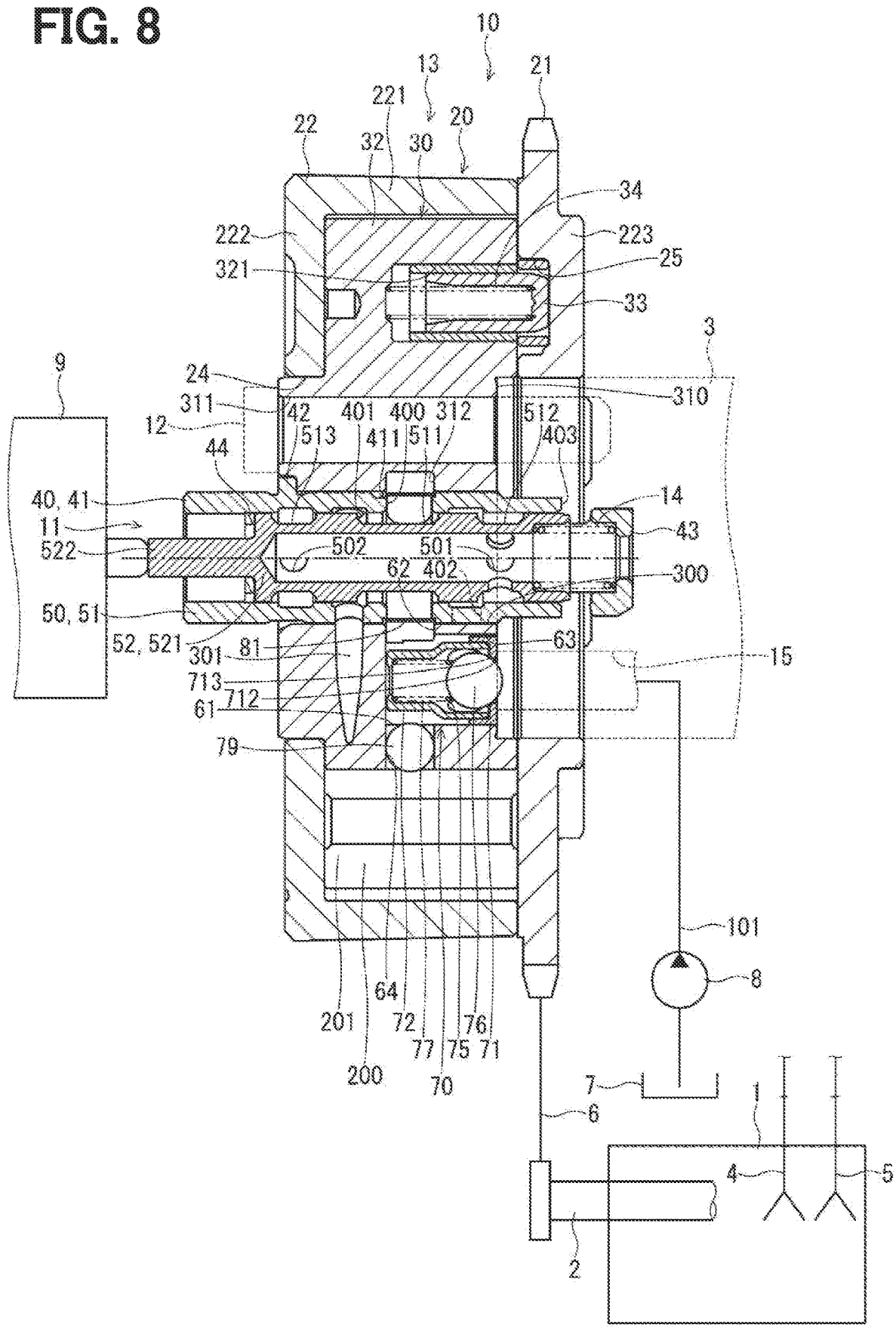
FIG. 8 is a cross-sectional view illustrating a valve timing adjusting device according to a third embodiment.

FIG. 8 illustrates a valve timing adjusting device according to a third embodiment. The third embodiment is different from the first embodiment in the configurations of the check valve part 70 and the like.

In the present embodiment, a communication hole 64 is formed in the vane rotor 30. The communication hole 64 is formed to communicate with the oil passage portion 61. More specifically, the communication hole 64 is formed to connect the oil passage portion 61 and the outer peripheral wall of the boss 31. That is, the communication hole 64 is formed so as to open in the outer peripheral wall of the boss 31.

The communication hole 64 is coaxial with and has the same diameter as the recess hole 62. Thus, the communication hole 64 and the recess hole 62 can be formed by a single process such as drilling.

The check valve part 70 further includes a sealing member 79. The sealing member 79 is formed of, for example, metal in a spherical shape. The sealing member 79 is press-fitted into the communication hole 64 so as to close the opening of the communication hole 64 on the side opposite to the oil passage portion 61. Thus, it is possible to suppress leakage of the hydraulic oil from the oil passage portion 61 via the communication hole 64.

The filter 81 is provided on the downstream side of the sealing member 79 in a flow of the hydraulic oil during the forward flow in the oil supply passage 101.

As described above, in the present embodiment, the check valve part 70 includes the sealing member 79 as the "press-fit member" which is a member press-fitted into the communication hole 64 communicating with the oil passage portion 61.

The filter 81 is provided on the downstream side with respect to the sealing member 79 in the oil supply passage 101 and can collect foreign matter in the oil supply passage 101. Accordingly, even if a press-fit burr or a press-fit residue is generated when the sealing member 79 is press-fitted into the communication hole 64, the press-fit burr or the press-fit residue can be collected by the filter 81 on the downstream side with respect to the sealing member 79. Thus, it is possible to suppress the press-fit burr or the press-fit residue from entering the sliding gap of the precision sliding components such as the control spool 50, the control sleeve 40, the vane rotor 30, the housing 20, and the like provided downstream of the sealing member 79. Therefore, it is possible to suppress abnormal wear of components due to the press-fit burr or the press-fit residue, and engagement of the press-fit burr or the press-fit residue with the components.

In the present embodiment, the communication hole 64 is formed so as to open to the outside of the vane rotor 30 of the phase conversion unit 13. The sealing member 79 as the "press-fit member" is press-fitted into the communication hole 64 so as to close the opening of the communication hole 64.

The present embodiment concretely specifies a portion where the sealing member 79 as the "press-fit member" is press-fitted.

Fourth Embodiment

Figure 9:
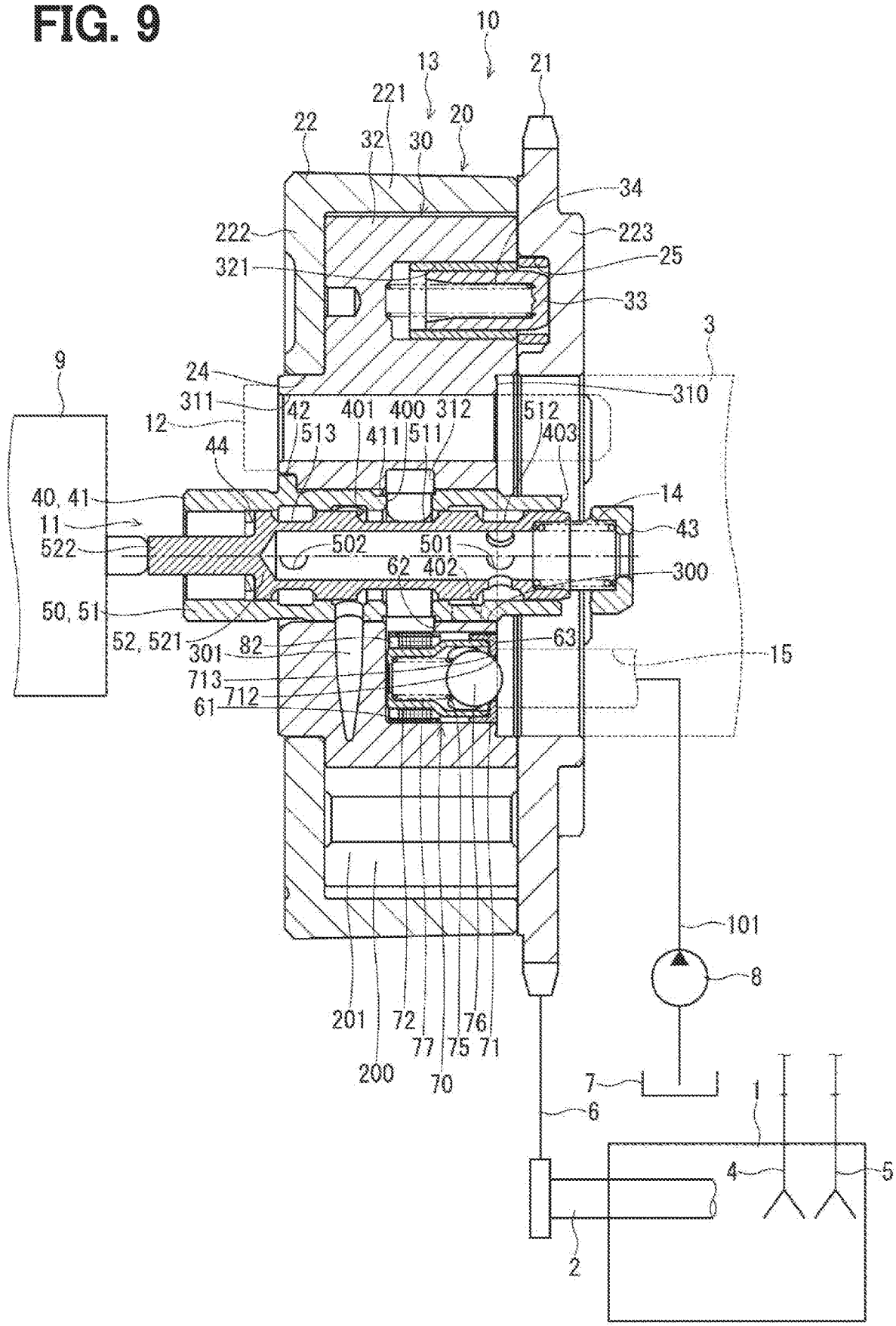
FIG. 9 is a cross-sectional view illustrating a valve timing adjusting device according to a fourth embodiment.

FIG. 9 illustrates a valve timing adjusting device according to a fourth embodiment. The fourth embodiment is different from the first embodiment in the configurations of the filter and the like.

The present embodiment includes a filter 82 instead of the filter 81 described in the first embodiment.

Figure 10:
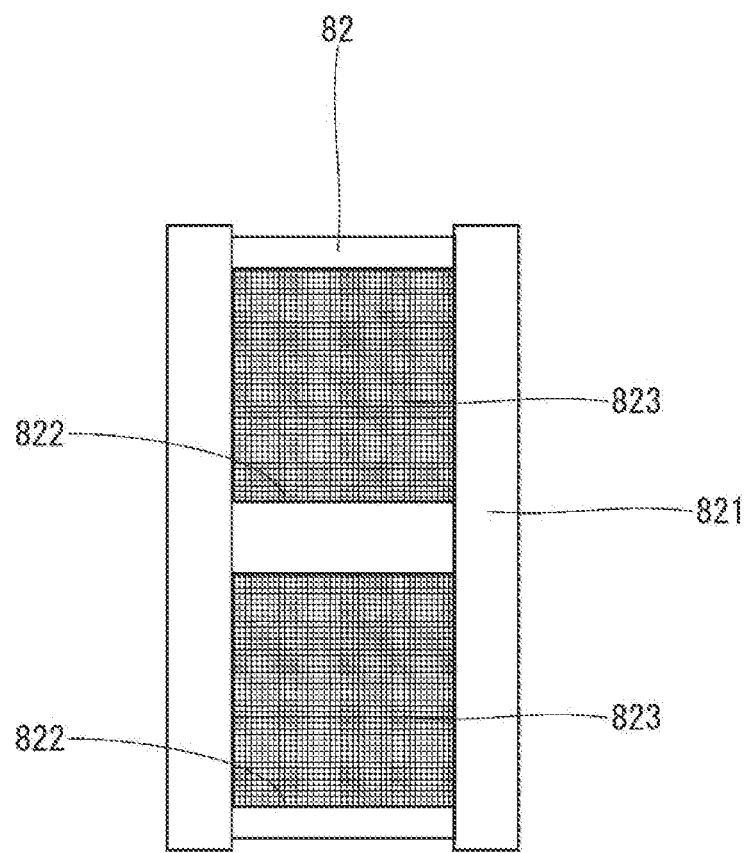
FIG. 10 is a diagram illustrating a filter of the valve timing adjusting device according to the fourth embodiment.

As illustrated in FIG. 10, the filter 82 includes a filter holding part 821, holding openings 822, and a filter part 823. The filter holding part 821 is formed in a substantially cylindrical shape. The holding openings 822 are formed to connect an inner peripheral wall and an outer peripheral wall of the filter holding part 821. Four holding openings 822 are formed at equal intervals in the circumferential direction of the filter holding part 821. The filter part 823 is formed of a mesh-like member, and is held by the filter holding part 821 in the holding opening 822. The filter 82 can collect foreign matter contained in the hydraulic oil passing through the filter part 823.

The filter 82 is provided in the oil passage portion 61 so as to be located on the radially outer side of the sleeve 72 of the check valve part 70. Here, the filter 82 closes the recess hole 62 with the filter part 823. As described above, in the oil supply passage 101, the filter 82 is provided on the downstream side of the valve seat portion 71 and on the upstream side of the recess hole 62 in a flow of the hydraulic oil during the forward flow.

As described above, in the present embodiment, the check valve part 70 includes the valve seat portion 71 as the "press-fit member" which is a member press-fitted into the oil passage portion 61.

The filter 82 is provided on the downstream side with respect to the valve seat portion 71 in the oil supply passage 101 and can collect foreign matter in the oil supply passage 101. Therefore, as in the first embodiment, it is possible to suppress abnormal wear of the components due to the press-fit burr or the press-fit residue, and engagement of the press-fit burr or the press-fit residue with the components.

Fifth Embodiment

Figure 11:
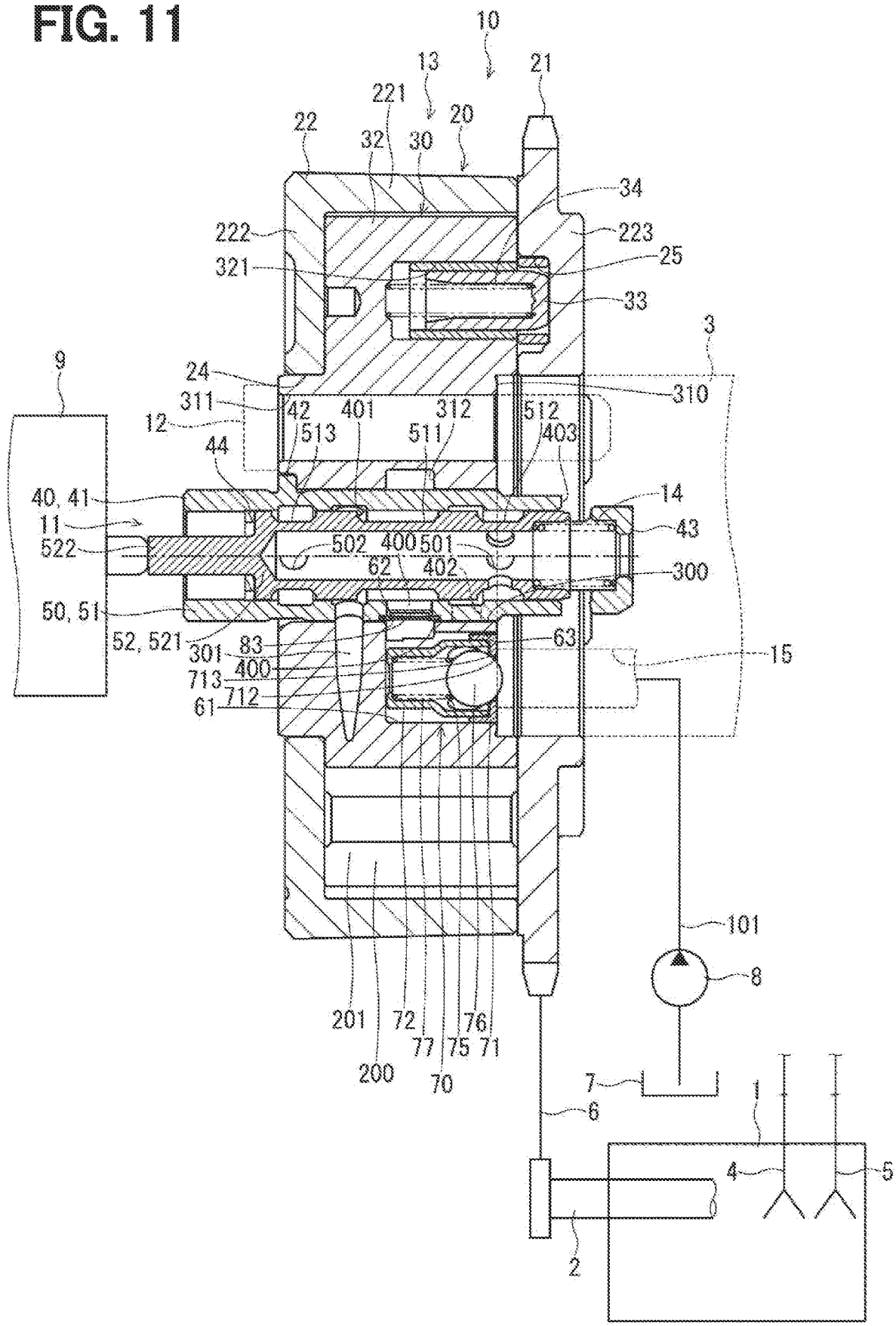
FIG. 11 is a cross-sectional view illustrating a valve timing adjusting device according to a fifth embodiment.

FIG. 11 illustrates a valve timing adjusting device according to a fifth embodiment. The fifth embodiment is different from the first embodiment in the configurations of the filter and the like.

The present embodiment includes a filter 83 instead of the filter 81 described in the first embodiment.

Figure 12:
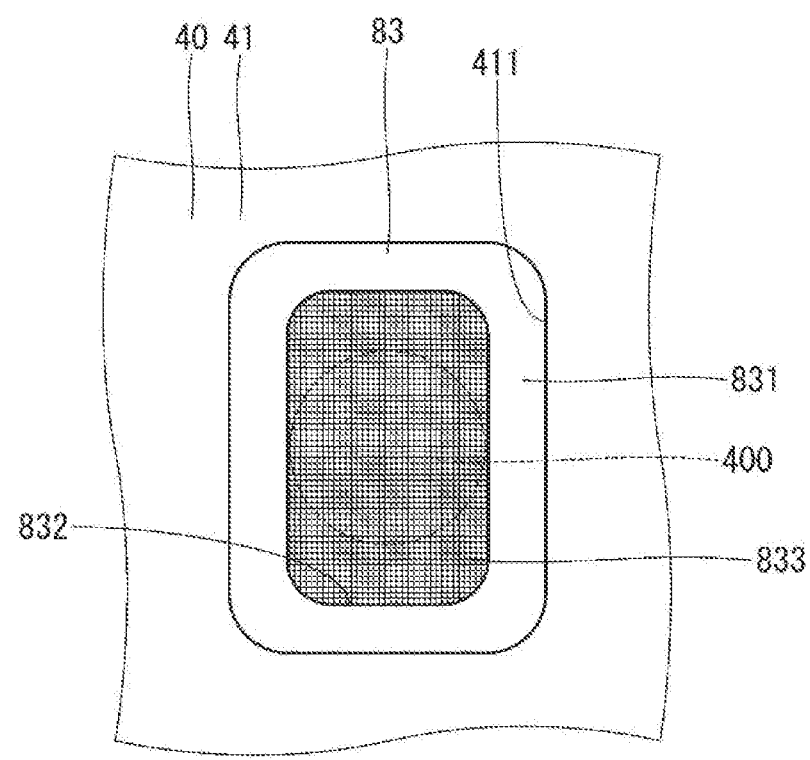
FIG. 12 is a diagram illustrating a filter of the valve timing adjusting device according to the fifth embodiment and the vicinity thereof.

As illustrated in FIG. 12, the filter 83 includes a filter holding part 831, a holding opening 832, and a filter part 833. The filter holding part 831 is formed in a substantially rectangular plate shape. The holding opening 832 is formed in a substantially rectangular shape so as to connect one surface and the other surface of the filter holding part 831. The filter part 833 is formed of a mesh-like member, and is held by the filter holding part 831 in the holding opening 832. The filter 83 can collect foreign matter contained in the hydraulic oil passing through the filter part 833.

In the present embodiment, the sleeve recess 411 is formed in a partial range in the circumferential direction of the control sleeve body 41. One sleeve port 400 is formed in a substantially circular shape in the circumferential direction of the control sleeve body 41 so as to connect the sleeve recess 411 and the inner peripheral wall of the control sleeve body 41. The control sleeve 40 is provided in the rotor hole 300 so that the sleeve port 400 faces and communicates with the recess hole 62.

The filter 83 is provided in the sleeve recess 411 of the control sleeve body 41 so that the filter part 833 covers the sleeve port 400. The filter 83 is provided in the oil supply passage 101 on the downstream side of the valve seat portion 71 in a flow of the hydraulic oil during the forward flow and on the upstream side of the sleeve port 400 in a flow of the hydraulic oil during the forward flow.

As described above, in the present embodiment, the check valve part 70 includes the valve seat portion 71 as the "press-fit member" which is a member press-fitted into the oil passage portion 61.

The filter 83 is provided on the downstream side with respect to the valve seat portion 71 in the oil supply passage 101 and can collect foreign matter in the oil supply passage 101. Therefore, as in the first embodiment, it is possible to suppress abnormal wear of the components due to the press-fit burr or the press-fit residue, and engagement of the press-fit burr or the press-fit residue with the components.

Sixth Embodiment

Figure 13:
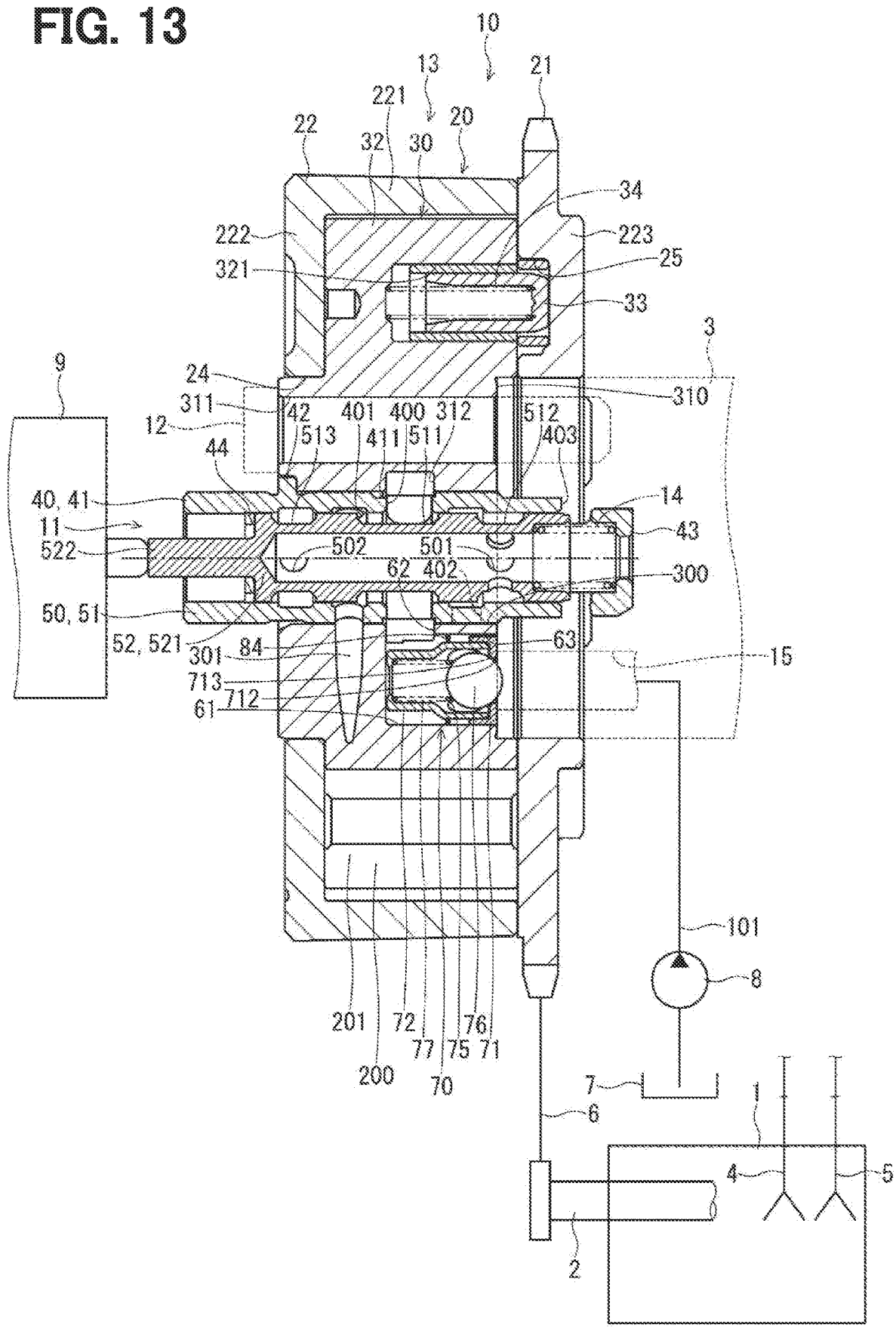
FIG. 13 is a cross-sectional view illustrating a valve timing adjusting device according to a sixth embodiment.

FIG. 13 illustrates a valve timing adjusting device according to a sixth embodiment. The sixth embodiment is different from the first embodiment in the configurations of the filter and the like.

The present embodiment includes a filter 84 instead of the filter 81 described in the first embodiment.

Figure 14:
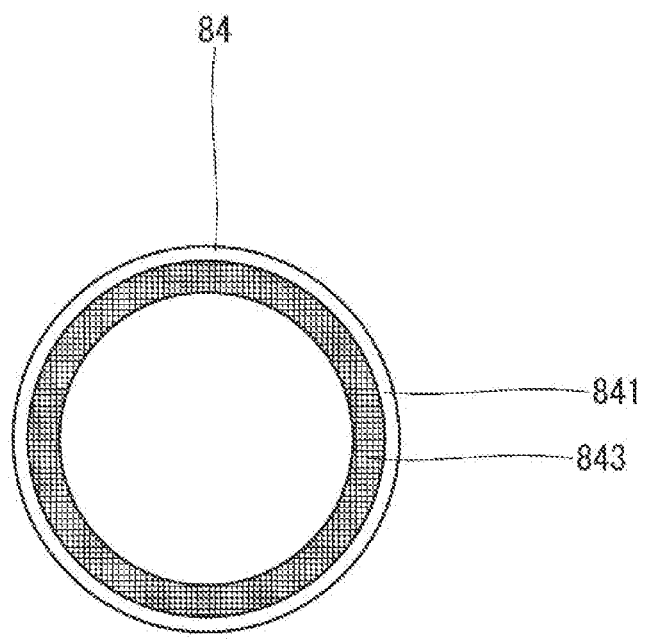
FIG. 14 is a diagram illustrating a filter of the valve timing adjusting device according to the sixth embodiment.

As illustrated in FIG. 14, the filter 84 includes a filter holding part 841 and a filter part 843. The filter holding part 841 is formed in a substantially annular shape. The filter part 843 is formed in a substantially annular shape by a mesh-like member, and has an outer edge held by an inner edge of the filter holding part 841. The filter 84 can collect foreign matter contained in the hydraulic oil passing through the filter part 843.

The filter 84 is provided in the oil passage portion 61 so as to be located on the radially outer side of the sleeve 72 of the check valve part 70. More specifically, the filter 84 is provided between the lateral hole 75 and the recess hole 62 so that an outer edge of the filter holding part 841 abuts on the oil passage portion 61 and the inner peripheral wall of the escape portion 63, and an inner edge of the filter part 843 abuts on the outer peripheral wall of the sleeve 72. As described above, in the oil supply passage 101, the filter 84 is provided on the downstream side of the valve seat portion 71 in a flow of the hydraulic oil during the forward flow and on the upstream side of the recess hole 62 in a flow of the hydraulic oil during the forward flow.

As described above, in the present embodiment, the check valve part 70 includes the valve seat portion 71 as the "press-fit member" which is a member press-fitted into the oil passage portion 61.

The filter 84 is provided on the downstream side with respect to the valve seat portion 71 in the oil supply passage 101 and can collect foreign matter in the oil supply passage 101. Therefore, as in the first embodiment, it is possible to suppress abnormal wear of the components due to the press-fit burr or the press-fit residue, and engagement of the press-fit burr or the press-fit residue with the components.

Seventh Embodiment

Figure 15:
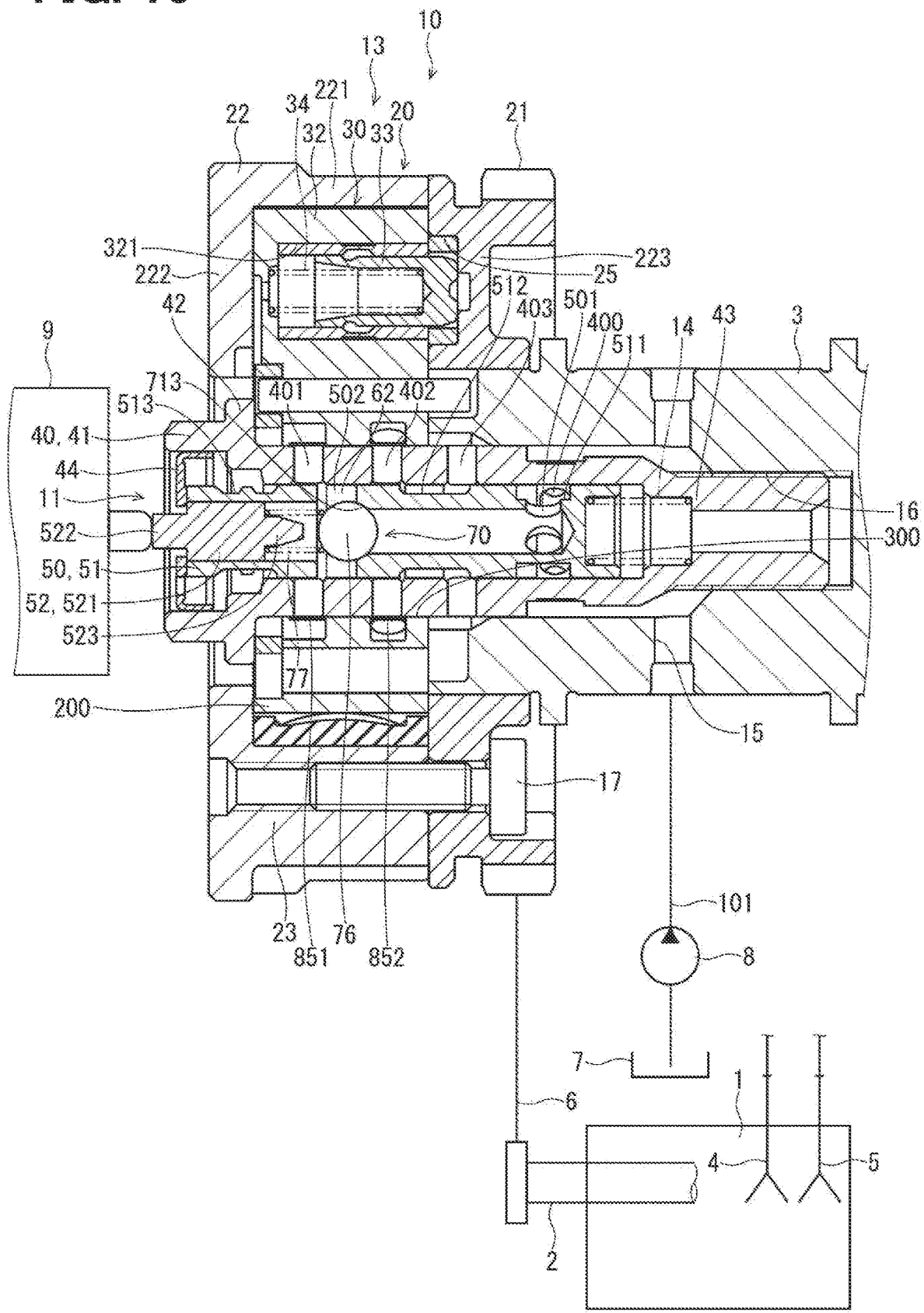
FIG. 15 is a cross-sectional view illustrating a valve timing adjusting device according to a seventh embodiment.

FIG. 15 illustrates a valve timing adjusting device according to a seventh embodiment. The seventh embodiment is different from the first embodiment in the configurations of the phase conversion unit 13, the hydraulic oil control unit 11, the check valve part 70, the filter, and the like.

In the present embodiment, the check valve part 70 includes the sealing portion 52, the valve seat 713, the valve body 76, and the spring 77.

In the present embodiment, the cylindrical portion 221 and the plate portion 222 of the case 22 and the plate portion 223 are fixed by bolts 17.

The vane rotor 30 is fixed to the camshaft 3 by screwing an end of the control sleeve body 41 of the hydraulic oil control unit 11 opposite to the sleeve locking portion 42 into a bolt hole 16 formed in an end of the camshaft 3.

The sleeve port 401, the sleeve port 402, the sleeve port 403, and the sleeve port 400 are formed in this order along the axial direction of the control sleeve body 41.

The control spool body 51 and the sealing portion 52 are formed separately. A substantially cylindrical oil passage portion 61 is formed inside an end of the control spool body 51 opposite to the control spring 14. The sealing portion 52 is press-fitted into the oil passage portion 61. The sealing portion 52 includes a sealing portion body 521, a projecting portion 522, and a restriction portion 523.

An outer peripheral wall of the sealing portion body 521 is fitted to an inner peripheral wall of the oil passage portion 61. The projecting portion 522 is formed so as to project in a substantially columnar shape from an end surface of the sealing portion body 521 opposite to the camshaft 3. The restriction portion 523 is formed so as to project in a substantially columnar shape from an end surface of the sealing portion body 521 opposing the camshaft 3.

The spool recess 511, the spool recess 512, and the spool recess 513 are formed in this order from the end of the control spool body 51 adjacent to the control spring 14 toward the sealing portion 52. The spool port 501 is formed to connect the spool recess 511 and the inner peripheral wall of the control spool body 51. The spool port 502 is formed to connect the outer peripheral wall and the inner peripheral wall of the control spool body 51 on the sealing portion 52 side with respect to the spool recess 512.

The hydraulic oil pressure-fed from the oil pump 8 is supplied to the retard chamber 201 via the supply hole 15 of the camshaft 3, the sleeve port 400, the spool recess 511, the spool port 501, the inside of the control spool body 51, the oil passage portion 61, the spool port 502, the sleeve port 401, and the retard oil passage portion 301. The hydraulic oil pressure-fed from the oil pump 8 is supplied to the advance chamber 202 via the supply hole 15 of the camshaft 3, the sleeve port 400, the spool recess 511, the spool port 501, the inside of the control spool body 51, the oil passage portion 61, the spool port 502, the sleeve port 402, and the advance oil passage portion 302. The oil passage portion 61 forms a part of the oil supply passage 101 inside.

The recess hole 62 is formed in the spool port 502. That is, the recess hole 62 is connected to the radially outer side of the oil passage portion 61, and forms a part of the oil supply passage 101 inside.

The check valve part 70 is provided in the oil passage portion 61. That is, the check valve part 70 is provided in the oil supply passage 101.

The valve seat 713 is formed in a substantially annular tapered shape on the inner peripheral wall of the control spool body 51 at location between the spool port 501 and the spool port 502 and the recess hole 62.

The valve body 76 is movable in the valve opening direction or the valve closing direction between the valve seat 713 and a tip of the restriction portion 523 inside the oil passage portion 61. When the valve body 76 abuts on the valve seat 713, movement in the valve closing direction is restricted. When the valve body abuts on the tip of the restriction portion 523, movement in the valve opening direction is restricted.

One end of the spring 77 abuts on the valve body 76, and the other end abuts on an end surface of the sealing portion body 521 opposing the valve body 76. The spring 77 biases the valve body 76 in the valve closing direction. Consequently, the valve body 76 is pressed against the valve seat 713.

The present embodiment includes a filter 851 and a filter 852 instead of the filter 81 described in the first embodiment.

The filter 851 and the filter 852 are formed in a substantially cylindrical shape by winding a long mesh-like member in the longitudinal direction. The filter 851 is provided on the radially outer side of the control sleeve body 41 so as to close the sleeve port 401.

The filter 852 is provided on the radially outer side of the control sleeve body 41 so as to close the sleeve port 403 (see FIG. 15). That is, the filter 851 and the filter 852 are provided on the downstream side of the sealing portion 52 in a flow of the hydraulic oil during the forward flow in the oil supply passage 101.

As described above, in the present embodiment, the check valve part 70 includes the sealing portion 52 as the "press-fit member" which is a member press-fitted into the oil passage portion 61.

The filter 851 and the filter 852 are provided on the downstream side with respect to the sealing portion 52 in the oil supply passage 101, and can collect foreign matter in the oil supply passage 101. Accordingly, even if a press-fit burr or a press-fit residue is generated when the sealing portion 52 is press-fitted into the oil passage portion 61, the press-fit burr or the press-fit residue can be collected by the filter 851 and the filter 852 on the downstream side with respect to the sealing portion 52. Thus, it is possible to suppress the press-fit burr or the press-fit residue from entering the sliding gap of the precision sliding components such as the vane rotor 30, the housing 20, and the like provided downstream of the sealing portion 52. Therefore, it is possible to suppress abnormal wear of components due to the press-fit burr or the press-fit residue, and engagement of the press-fit burr or the press-fit residue with the components.

In the present embodiment, the oil passage portion 61 is formed so as to open to the outside of the control spool body 51 of the hydraulic oil control unit 11. The sealing portion 52 as the "press-fit member" is press-fitted into the oil passage portion 61 so as to close the opening of the oil passage portion 61.

The present embodiment concretely specifies a portion where the sealing portion 52 as the "press-fit member" is press-fitted.

Eighth Embodiment

Figure 16:
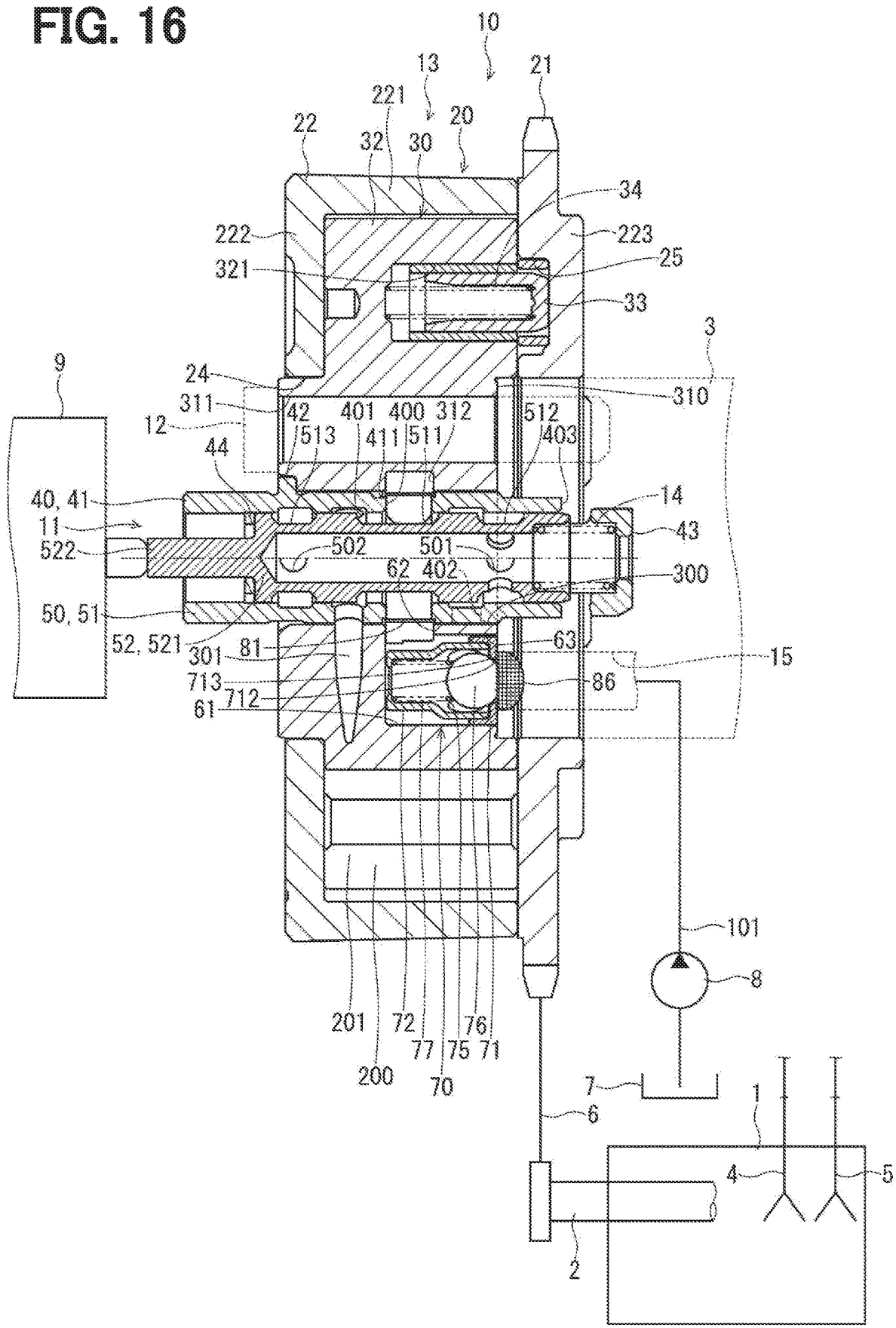
FIG. 16 is a cross-sectional view illustrating a valve timing adjusting device according to an eighth embodiment.

FIG. 16 illustrates a valve timing adjusting device according to an eighth embodiment. The eighth embodiment is different from the first embodiment in the configurations of the filter and the like.

The present embodiment further includes a filter 86 in addition to the filter 81.

The filter 86 is formed in a bottomed cylindrical shape by a mesh-shaped member. A bottom portion of the filter 86 is formed in a curved shape so as to protrude to a side opposite to a cylindrical portion. The filter 86 can collect foreign matter contained in the hydraulic oil passing through the filter 86.

The filter 86 is provided in the supply hole 15 so that an opening on a side opposite to the bottom of the cylindrical portion abuts on an end surface of the valve seat portion 71 opposite to the sleeve 72 to close the valve seat hole 712. As described above, the filter 86 is provided on the upstream side of the valve seat portion 71 in a flow of the hydraulic oil during the forward flow in the oil supply passage 101.

Here, the filter 81 corresponds to a "downstream filter", and the filter 86 corresponds to an "upstream filter".

As described above, in the present embodiment, the filter 81 is the "downstream filter". The valve timing adjusting device 10 further includes the filter 86 as the "upstream filter". The filter 86 is provided on the upstream side with respect to the valve seat portion 71 as the "press-fit member" in the oil supply passage 101, and can collect foreign matter in the oil supply passage 101.

Thus, foreign matter in the hydraulic oil on the upstream side with respect to the check valve part 70 in the oil supply passage 101 can be suppressed from being caught between the valve body 76 and the valve seat 713, and valve closing failure of the check valve part 70 can be suppressed. It is possible to suppress foreign matter in the hydraulic oil on the upstream side with respect to the check valve part 70 in the oil supply passage 101 from entering the sliding gap of the precision sliding components such as the control spool 50, the control sleeve 40, the vane rotor 30, the housing 20, and the like provided downstream of the check valve part 70.

Other Embodiments

In the seventh embodiment, the filter 851 and the filter 852 as "downstream filter" are provided. In another embodiment, only one of the filter 851 and the filter 852 may be provided.

In another embodiment, the housing 20 and the crankshaft 2 may be connected to each other by a transmission member such as a belt instead of the chain 6, for example.

In another embodiment, the valve timing adjusting device 10 may adjust the valve timing of the exhaust valve 5 of the engine 1.

As described above, the present disclosure is not limited to the above embodiment, and can be implemented in various forms without departing from the gist of the present disclosure.

The present disclosure has been described based on the embodiments. However, the present disclosure is not limited to the embodiments and structures. The present disclosure also encompasses various modifications and variations within the scope of equivalents. Various combinations and modes, and other combinations and modes including only one element, more elements, or less elements therein are also within the scope and spirit of the present disclosure.

What is claimed is:

1. A valve timing adjusting device that adjusts a valve timing of a valve of an internal combustion engine, the valve timing adjusting device comprising:
    a phase conversion unit that includes a hydraulic chamber and is capable of converting a rotational phase between a drive shaft and a driven shaft of the internal combustion engine by: hydraulic oil supplied from a hydraulic oil supply source to the hydraulic chamber, and adjusting the valve timing of the valve;
    a hydraulic oil controller capable of controlling flow of the hydraulic oil supplied to the hydraulic chamber by controlling the hydraulic oil flowing through an oil supply passage connecting the hydraulic oil supply source and the hydraulic chamber;
    an oil passage portion that forms a part of the oil supply passage inside;
    a check valve part configured to allow the hydraulic oil to flow from the hydraulic oil supply source to the hydraulic chamber, and restrict the hydraulic oil from flowing from the hydraulic chamber to the hydraulic oil supply source, wherein the check valve part includes a press-fit member press-fitted into the oil passage portion or a communication hole communicating with the oil passage portion; and
    a filter provided downstream of the press-fit member in the oil supply passage so as to collect a foreign matter in the oil supply passage, wherein
    the check valve part has a valve seat, a valve body provided so as to separate from or abut on the valve seat, and a spring that biases the valve body toward the valve seat,
    a part of the filter is located on a radially outer side of the valve spring, the phase conversion unit includes a housing that rotates with the drive shaft and a vane rotor fixed on the driven shaft to rotate with the driven shaft, the hydraulic chamber is formed between the housing and the vane rotor, the hydraulic oil controller includes a control spool provided at a center of the vane rotor and formed in a cylindrical shape so as to reciprocate in an axial direction for controlling the hydraulic oil and a control spring that biases the control spool in a direction away from the driven shaft, and an end surface of the control spring adjacent to the driven shaft is located closer to the driven shaft than an end surface of the valve spring away from the driven shaft.

2. The valve timing adjusting device according to claim 1, wherein the filter is a downstream filter, and the valve timing adjusting device further comprises an upstream filter provided upstream of the press-fit member in the oil supply passage so as to collect foreign matter in the oil supply passage.

3. The valve timing adjusting device according to claim 1, wherein the check valve part includes the press-fit member in which the valve seat is formed.

4. The valve timing adjusting device according to claim 1, wherein the oil passage portion is formed to open to an outside of the phase conversion unit or the hydraulic oil controller, and the press-fit member is press-fitted into the oil passage portion so as to close an opening of the oil passage portion.

5. The valve timing adjusting device according to claim 1, wherein the communication hole is formed to open to an outside of the phase conversion unit, and the press-fit member is press-fitted into the communication hole so as to close an opening of the communication hole.

6. The valve timing adjusting device according to claim 1, wherein the filter is at least partially positioned is positioned between the end surface of the valve spring away from the driven shaft and the end surface of the control spring adjacent to the driven shaft in an axial direction of the valve spring.

7. The valve timing adjusting device according to claim 1, wherein the check valve part is located radially outward of the control spool.

8. The valve timing adjusting device according to claim 1, wherein the check valve part is formed integrally with the control spool so as to reciprocate together with the control spool in the axial direction.

* * * * *